(12) United States Patent
Takagi

(10) Patent No.: US 11,977,876 B2
(45) Date of Patent: May 7, 2024

(54) UPDATE DEVICE, UPDATE METHOD AND PROGRAM

(71) Applicant: Hitachi, Ltd., Tokyo (JP)

(72) Inventor: Keisuke Takagi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 129 days.

(21) Appl. No.: 17/689,499

(22) Filed: Mar. 8, 2022

(65) Prior Publication Data

US 2022/0350589 A1    Nov. 3, 2022

(30) Foreign Application Priority Data

Apr. 30, 2021   (JP) .................. 2021-077166

(51) Int. Cl.
*G06F 8/65* (2018.01)
(52) U.S. Cl.
CPC ...................... *G06F 8/65* (2013.01)
(58) Field of Classification Search
None
See application file for complete search history.

(56) References Cited

U.S. PATENT DOCUMENTS

| | | | | |
|---|---|---|---|---|
| 7,526,534 B2* | 4/2009 | Henseler | ................... | G06F 9/50 709/220 |
| 9,344,496 B2* | 5/2016 | Hurst | ................. | H04N 21/2393 |
| 2009/0240791 A1* | 9/2009 | Sakurai | ..................... | G06F 8/65 709/221 |
| 2016/0050123 A1* | 2/2016 | Nishanov | ................ | H04L 67/10 709/223 |
| 2018/0176120 A1* | 6/2018 | Katz | ..................... | H04L 45/302 |
| 2018/0227363 A1* | 8/2018 | Xiang | .................. | H04L 41/044 |
| 2018/0270125 A1* | 9/2018 | Jain | ......................... | G06F 16/00 |
| 2020/0073655 A1* | 3/2020 | Park | ......................... | G06F 8/65 |
| 2021/0157655 A1* | 5/2021 | Foreman | ............... | G06F 9/5077 |
| 2021/0328913 A1* | 10/2021 | Nainar | .................... | H04L 45/02 |

FOREIGN PATENT DOCUMENTS

| JP | 2020-27530 A | 2/2020 | | |
|---|---|---|---|---|
| WO | WO-2020011214 A1 * | 1/2020 | ......... | G06F 9/45558 |

\* cited by examiner

*Primary Examiner* — Ryan D. Coyer
(74) *Attorney, Agent, or Firm* — Procopio, Cory, Hargreaves & Savitch LLP

(57) ABSTRACT

Provided is an update device capable of appropriately updating the nodes used in business processing. The update device comprises a communication control unit which instructs the load balancer to stop distribution to the first cluster, a transfer unit which instructs the first management node and the second management node to transfer the first execution node from being under management of the first management node to being under management of the second management node, and an update unit which instructs the first management node to update the first management node on grounds that the first execution node being under management of the first management node has been transferred to being under management of the second management node.

7 Claims, 15 Drawing Sheets

| NODE NAME | CLASSIFICATION | MANAGEMENT NODE GROUP | AFFILIATED CLUSTER | UPDATE STATUS |
|---|---|---|---|---|
| MANAGEMENT NODE A1 | MANAGEMENT NODE A | MANAGEMENT NODE A | CLUSTER A | UPDATED |
| MANAGEMENT NODE A2 | MANAGEMENT NODE A | MANAGEMENT NODE A | CLUSTER A | UPDATED |
| MANAGEMENT NODE A3 | MANAGEMENT NODE A | MANAGEMENT NODE A | CLUSTER A | UPDATED |
| EXECUTION NODE A1 | EXECUTION NODE | MANAGEMENT NODE A | CLUSTER A | NOT UPDATED |
| EXECUTION NODE A2 | EXECUTION NODE | MANAGEMENT NODE A | CLUSTER A | NOT UPDATED |
| MANAGEMENT NODE B1 | MANAGEMENT NODE B | MANAGEMENT NODE B | CLUSTER B | NOT UPDATED |
| MANAGEMENT NODE B2 | MANAGEMENT NODE B | MANAGEMENT NODE B | CLUSTER B | NOT UPDATED |
| MANAGEMENT NODE B3 | MANAGEMENT NODE B | MANAGEMENT NODE B | CLUSTER B | NOT UPDATED |
| EXECUTION NODE B1 | EXECUTION NODE | MANAGEMENT NODE B | CLUSTER B | NOT UPDATED |
| EXECUTION NODE B2 | EXECUTION NODE | MANAGEMENT NODE B | CLUSTER B | NOT UPDATED |

| CONTAINER NAME | ORIGINAL HOST | CURRENT HOST |
|---|---|---|
| APP1 | EXECUTION NODE A1 | EXECUTION NODE C |
| APP2 | EXECUTION NODE A1 | EXECUTION NODE C |
| APP3 | EXECUTION NODE A2 | EXECUTION NODE A2 |

501  502  503

UPDATE DEVICE, UPDATE METHOD AND PROGRAM

TECHNICAL FIELD

The present invention generally relates to a technology of updating nodes used in business processing.

BACKGROUND ART

With a container management platform using container technology, one cluster is generally configured by including a plurality of management nodes and a plurality of execution nodes. With this kind of cluster, business processing such as the configuration change of clusters and the collection of statistical information can be performed by accessing an API (Application Programming Interface) equipped in the management node.

Moreover, when updating a container management platform, a rolling update is adopted for the purpose of avoiding the suspension of business operations.

In a rolling update, while the machines in the cluster are updated one machine at a time, since the API is stopped when updating the management nodes, the operator is unable to conduct business operations. Thus, business operations during the update cannot be conducted until the update of the management nodes in the cluster is completed. In other words, as a result of periods occurring that the setting of application programs cannot be changed and the expansion of resources cannot be performed as business operations for dealing with high loads or defects in the cluster, there is a risk of causing adverse effects on the operation of services.

With respect to this point, disclosed is a maintenance device which selects information processing devices among a plurality of information processing devices in a quantity that is set based on a redundancy policy of a cluster, isolates the selected information processing devices from the cluster, transfers virtual machines running on the information processing devices isolated from the cluster to other information processing devices in the cluster, and performs maintenance work to the information processing devices isolated from the cluster (see PTL 1).

CITATION LIST

Patent Literature

[PTL 1] Japanese Unexamined Patent Application Publication No. 2020-27530

SUMMARY OF THE INVENTION

Problems to be Solved by the Invention

With the technology described in PTL 1, in order to reduce the time required for the rolling update, it is possible to properly select the nodes to be updated simultaneously and improve the update efficiency. Nevertheless, with the technology described in PTL 1 since no measures are taken for the business processing to be performed during the update of the management nodes, the operator is unable to conduct business operations while the management nodes are being updated.

The present invention was devised in view of the foregoing points, and an object of this invention is to propose an update device and the like capable of appropriately updating the nodes used in business processing.

Means to Solve the Problems

In order to achieve the foregoing object, the present invention provides an update device which updates a first cluster configured by including a first execution node capable of executing business processing distributed by a load balancer and a first management node that manages the first execution node, and a second cluster configured by including a second execution node capable of executing business processing distributed by the load balancer and a second management node that manages the second execution node, comprising: a communication control unit which instructs the load balancer to stop distribution to the first cluster; a transfer unit which instructs the first management node and the second management node to transfer the first execution node from being under management of the first management node to being under management of the second management node; and an update unit which instructs the first management node to update the first management node on grounds that the first execution node being under management of the first management node has been transferred to being under management of the second management node.

In the configuration described above, since the first execution node of the first cluster is transferred to be under management of the second management node, business processing based on the first execution node can be performed under management of the second management node. According to the foregoing configuration, for example, business processing based on the first execution node can be performed even when the first management node is being updated.

Advantageous Effects of the Invention

According to the present invention, a highly user friendly update device can be realized.

BRIEF DESCRIPTION OF DRAWINGS

FIG. 4 is a diagram showing an example of h node cluster information according to the first embodiment.

FIG. 5 is a diagram showing an example of the execution node information according to the first embodiment.

DESCRIPTION OF EMBODIMENTS

(I) First Embodiment

Figure 1:
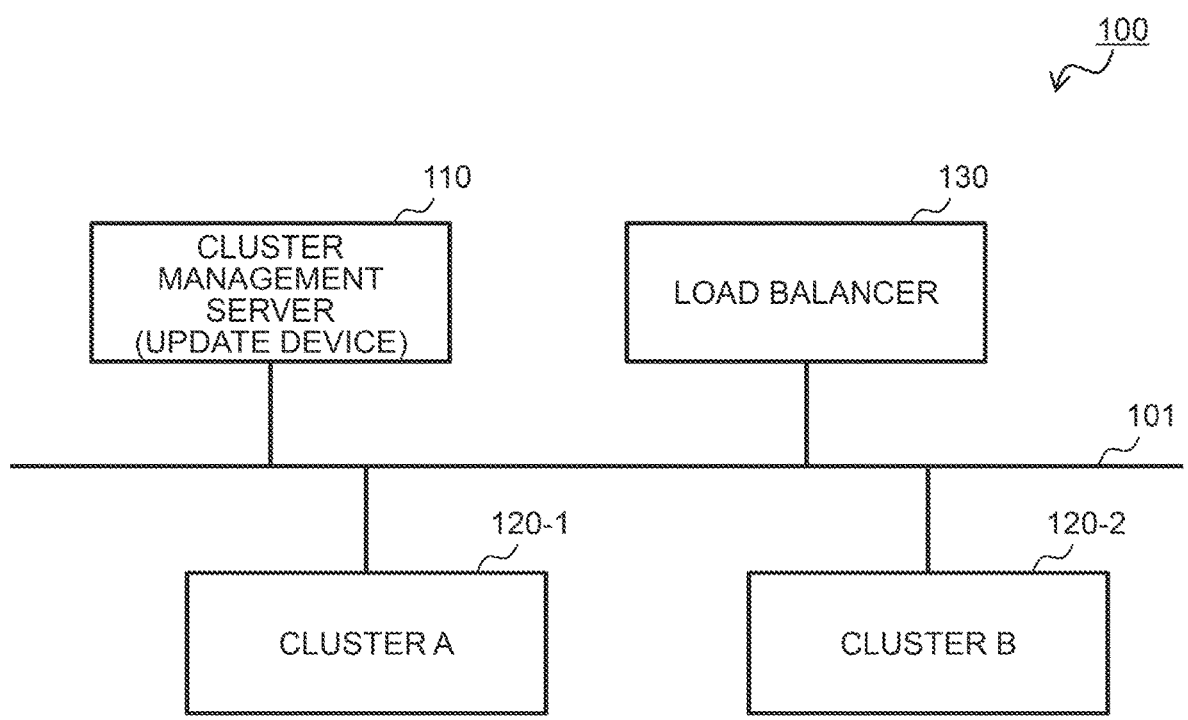
FIG. 1 is a diagram showing an example of the configuration of the business system according to the first embodiment.

An embodiment of the present invention is now explained in detail. Nevertheless, the present, invention is not limited to the following embodiment.

When updating a cluster configured from a management node and an execution node, the update device according to this embodiment separates the execution node from the cluster to a separate cluster and then updates the management node of the cluster. For example, the update device moves (transfers) the execution node to be under management of another cluster by correcting the management information of the execution node under management of the management node to be updated. Accordingly, when updating the management node, the update device of this embodiment causes the execution node to be in a status that is not under management of the management node and separates the business processing and the update processing.

Subsequently, the update device transfers a container on the separated execution node to another execution node in a cluster of the separation destination, thereafter returns the separated execution node to the cluster of the separation source one execution node at a time, and thereby updates the execution node. For example, the update device corrects the management information of the management node, transfers the execution node to the cluster of the separation source, and thereafter updates the execution node. As described above, by separating the execution node to be updated from the environment in which the business processing is being performed, the update device controls the execution node so that it will not be subject to the business processing.

With the configuration described above, business processing while the nodes are being updated is enabled by separating the business processing and the update processing. It is thereby possible to avoid a situation in which the operator is unable to conduct business operations while the management nodes are being updated, and avoid the shutdown of the business application which uses that function.

Expressions such as "first", "second", "third" and the like in the present specification end the drawings are affixed for identifying the constituent elements, and are not necessarily limited to quantity or order. Moreover, the numbers used for identifying the constituent elements are used for each context, and a number used in one context may not necessarily refer to the same configuration in another context. Moreover, a constituent element identified with a certain number is not precluded from concurrently serving the function of a constituent element identified with another number.

An embodiment of the present invention is now explained with reference to the appended drawings. The following descriptions and drawings are exemplifications for explaining the present invention, and certain descriptions are omitted or simplified as needed for clarifying the explanation of the present invention. The present invention can also be worked in other various modes. Unless specifically limited herein, each constituent element may be singular or plural.

Note that, in the following explanation, the same reference numeral is assigned to the same element in the drawings, and any redundant explanation will be omitted. Moreover, when the same types of elements are explained without being differentiated, the common part (part excluding the branch number) of the reference code including the branch number will be used, and when the same types of elements are explained by being differentiated, the reference code including the branch number may be used. For example, when the clusters are explained without being differentiated, they will be indicated as "cluster 120", and when the individual clusters are explained by being differentiated, they may be indicated as "first cluster 120-1", "second cluster 120-2" and so on.

In FIG. 1, reference numeral 100 depicts the overall b system according to the first embodiment.

The business system 100 is configured by including a cluster management server 110, two or more clusters 120, and a load balancer 130. The cluster management server 110, the clusters 120 and the load balancer 130 are communicably connected via a network 101. With the business system 100, the load balancer 130 distributes a request for business processing (hereinafter referred to as the "business communication") to the two or more clusters 120 as the currently used system, and the clusters 120 are thereby operated.

The cluster management server 110 is an example of the update device, and is a physical machine or a virtual machine that manages the clusters 120. In the following explanation, a case where the cluster management server 110 is a physical machine is explained.

The duster 120 is a set of nodes capable of executing the business processing distributed by the load balancer 130. A node is a physical machine or a virtual machine configured by including a host OS such as a Linux (registered trademark) OS (operating system) and a container management application (container engine). The set of nodes includes an execution node capable of executing a container which runs a business application of performing business processing, and a management node capable of executing a container which runs a management application of managing the execution node. In the following explanation, a case where a first cluster 120-1 (hereinafter referred to as the "cluster A") and a second cluster 120-2 (hereinafter referred to as the "cluster B") are provided as the cluster 120 is explained.

The load balancer 130 is a device which distributes business processing (business communication) in a round-robin manner, for example, so that the load of business processing in each duster 120 will become balanced.

Note that the business system 100 is not limited to the configuration described above. For example, the business system 100 may also be configured by including three or more clusters 120 of the currently used system.

Figure 2A:
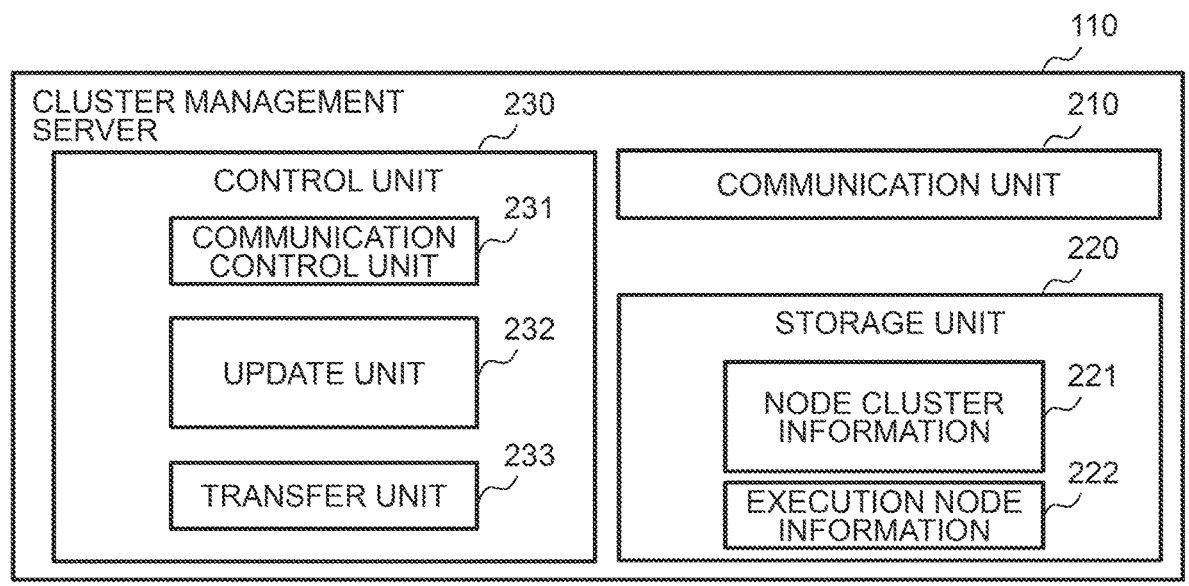
FIG. 2A is a diagram showing an example of the functional configuration of the cluster management server according to the first embodiment.

FIG. 2A is a diagram showing an example of the functional configuration of the cluster management server 110.

The cluster management server 110 comprises a communication unit 210, a storage unit 220, and a control unit 230.

The communication unit 210 controls the communication with the cluster 120 and the communication with the load balancer 130. The storage unit 220 stores node cluster information 221 and execution node information 222 as information for managing the ti configuration of the cluster 120. The node cluster information 221 is information indicating the relation of the nodes and the cluster 120. The execution node information 222 is information indicating the relation of the execution node and the container. The node cluster information 221 will be explained later with reference to FIG. 4, and the execution node information 222 will be explained later with reference to FIG. 5.

The control unit 230 comprises a communication control unit 231, an update unit 232, and a transfer unit 233. Based on an instruction from an operator for updating a predetermined cluster 120 (hereinafter referred to as the "operation start instruction"), the communication control unit 231 instructs the load balancer 130 to isolate that cluster 120 (block the business communication). The update unit 232 monitors the status (update status) of the nodes updated in the cluster 120, and performs control of updating the nodes. The transfer unit 233 instructs the transfer of the execution node and the transfer of the container to the management node according to the update status.

In addition to the functions described above, the cluster management server 110 may further comprise the functions of an operating system, a device driver, a file system, a DBMS (Data Base Management System) and the like.

Figure 2B:
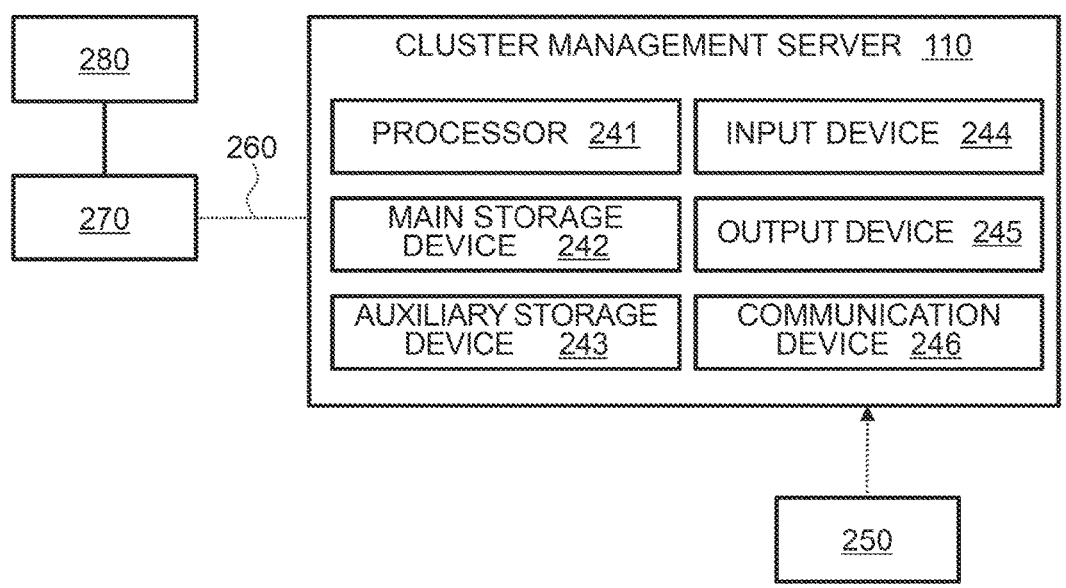
FIG. 2B is a diagram showing an example of the hardware configuration of the cluster management server according to the first embodiment.

FIG. 2B is a diagram showing an example of the hardware configuration of the cluster management server 110.

The cluster management server 110 comprises a processor 241, a main storage device 242, an auxiliary storage device 243, an input device 244, an output device 245, and a communication device 246.

The processor 241 is a device that performs arithmetic processing. The processor 241 is, for example, a CPU (Central Processing Unit), an MPU (Micro Processing Unit), a GPU (Graphics Processing Unit), an AI (Artificial Intelligence) chip or the like.

The main storage device 242 is a device that stores programs, data and the like. The storage device 242 is, for example, a ROM (Read Only Memory), a RAM (Random Access Memory) or the like. The ROM is an SRAM (Static Random Access Memory), an NVRAM (Non Volatile RAM), a mask ROM (Mask Read Only Memory), a PROM (Programmable ROM) or the like. The RAM is a DRAM (Dynamic Random Access Memory) or the like.

The auxiliary storage device 243 is a hard disk drive, a flash memory, an SSD (Solid State Drive), an optical storage device or the like. The optical storage device is a CD (Compact Disc), a DVD (Digital Versatile Disc) or the like. The programs and data stored in the auxiliary storage device 243 are read into the main storage device 242 as needed.

The input device 244 is, a user interface which receives information from a user. The input device 244 is, for example, a keyboard, a mouse, a card reader, a touch panel or the like.

The output device 245 is a user interface which outputs (display output, sound output, print output or the like) various types of information. The output device 245 is, for example, a display device which visualizes various types of information, a sound output device (speaker), a printing device or the like. The display device is an LCD (Liquid Crystal Display), a graphic card or the like.

The communication device 246 is a communication interface which communicates with other devices via a communication medium. The communication device 246 is, for example, an MC (Network Interface Card), a wireless communication module, a USB (Universal Serial Interface) module, a serial communication module or the like. The communication device 246 can also function as an input device which receives information from other devices that are communicably connected. Moreover, the communication device 246 can also function as an output device which sends information to other devices that are communicably connected.

The functions (communication unit 210, storage unit 220, control unit 230 and the like) of the cluster management server 110 may be realized, for example, by the processor 241 reading the programs stored in the auxiliary storage device 243 and executing the programs (software), or realized with hardware such as a dedicated circuit or the like, or realized based on a combination of software and hardware. Note that one function of the cluster management server 110 may be divided into a plurality of functions, or a plurality of functions may be consolidated into one function. Moreover, a part of the functions of the cluster management server 110 may be provided as a separate function, or included in another function. Moreover, a part of the functions of the cluster management server 110 may be realized with another machine (physical machine or virtual machine) capable of communicating with the cluster management server 110.

Moreover, the programs for realizing the foregoing functions of the cluster management server 110 may also be provided through data signals of a storage medium such as a CD-ROM 250, the internee or the like. For example, the cluster management server 110 may also receive the provision of programs via the CD-ROM 250. Moreover, the cluster management server 110 may include a connection function for connecting to a communication line 260. In the foregoing case, the computer 270 is a server computer which provides the programs, and stores the programs in a storage medium such as a storage apparatus 280 or the like. The communication line 260 is the Internet, a communication line of PC communication or the like, or a dedicated communication line or the like. The computer 270 may read the programs from the storage apparatus 280, and send the programs to the cluster management server 110 via the communication line 260. In other words, the computer 270 may send the programs as data signals via the communication line 260 through carrier waves. As described above, the programs can be provided as computer-readable computer program products in various forms such as storage mediums, data signals (carrier waves) and the like.

Figure 3A:
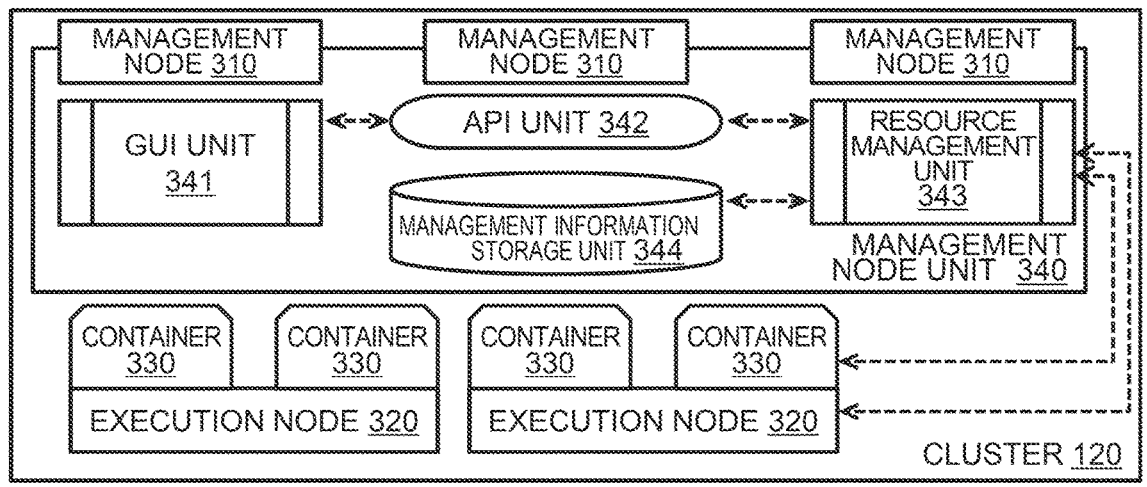
FIG. 3A is a diagram showing an example of the configuration of the clusters according to the first embodiment.

FIG. 3A is a diagram showing an example of the configuration of the cluster 120.

The cluster 120 is configured by including one or more management nodes 310, and one or more execution nodes 320. The execution node 320 can execute the container 330 which runs a business application.

The management node 310 is a physical machine or a virtual machine configured by including a host OS and container management software. The management node 310 operates a management node unit 340 (for example, management container) which provides a management function of the container management software. In the cluster 120, for example, three management nodes 310 provide fault tolerance and high availability to the cluster 120.

The execution node 320 is a physical machine or a virtual machine configured by including a host OS and container management software. The execution node 320 can execute a container 330 (container other than the management container) which runs a business application.

The container 330 is configured by including a business application used by an operator, and middleware and a library required for executing the business application.

The container 330 is disposed in the execution node 320 by the management node 310, and runs a business application.

The management node unit 340 manages (performs scheduling or the like of) the overall cluster 120. For example, the management node unit 340 newly disposes a container 330, changes the setting of an existing container 330, or updates the management node 310 and the execution node 320 in the cluster 120. More specifically, the management node unit 340 comprises a GUI unit 341, an API unit 342, a resource management unit 343, and a management information storage unit 344.

The GUI unit 341 provides a web-based user interface. According to the GUI unit 341, the user can perform the management, trouble shooting and the like of the cluster 120 and the application being executed in the cluster 120. The API unit 342 provides the API of the management node unit 340 to the outside. The resource management unit 343 manages the resources of the cluster 120 such as the management node 310, the execution node 320, the container 330, storage resources, a network IP (Internet Protocol) and the like. For example, the resource management unit 343 changes the configuration of the cluster 120 based on the transfer of the execution node 320 or the addition, edit ng or transfer of the container 330, and stores the management information of the changed configuration in the management information storage unit 344. The management information storage unit 344 is a management database (for example, key-value store having consistency and high availability) which stores the management information of the cluster 120.

Here, in the business processing, processing via the GUI unit 341 and processing such as information acquisition and configuration change to the resources in the cluster 120 via access to the API unit 342 are performed. In other words, while the management node 310 is being updated, the cluster 120 is unable to use the functions provided by the management node unit 340. For example, the GUI unit 341 is stopped and enters a state in which the operator's operation cannot be received. Moreover, for example, since the API unit 342 is also stopped, processing based on access that does not go through the GUI unit 341 cannot be performed.

Figure 3B:
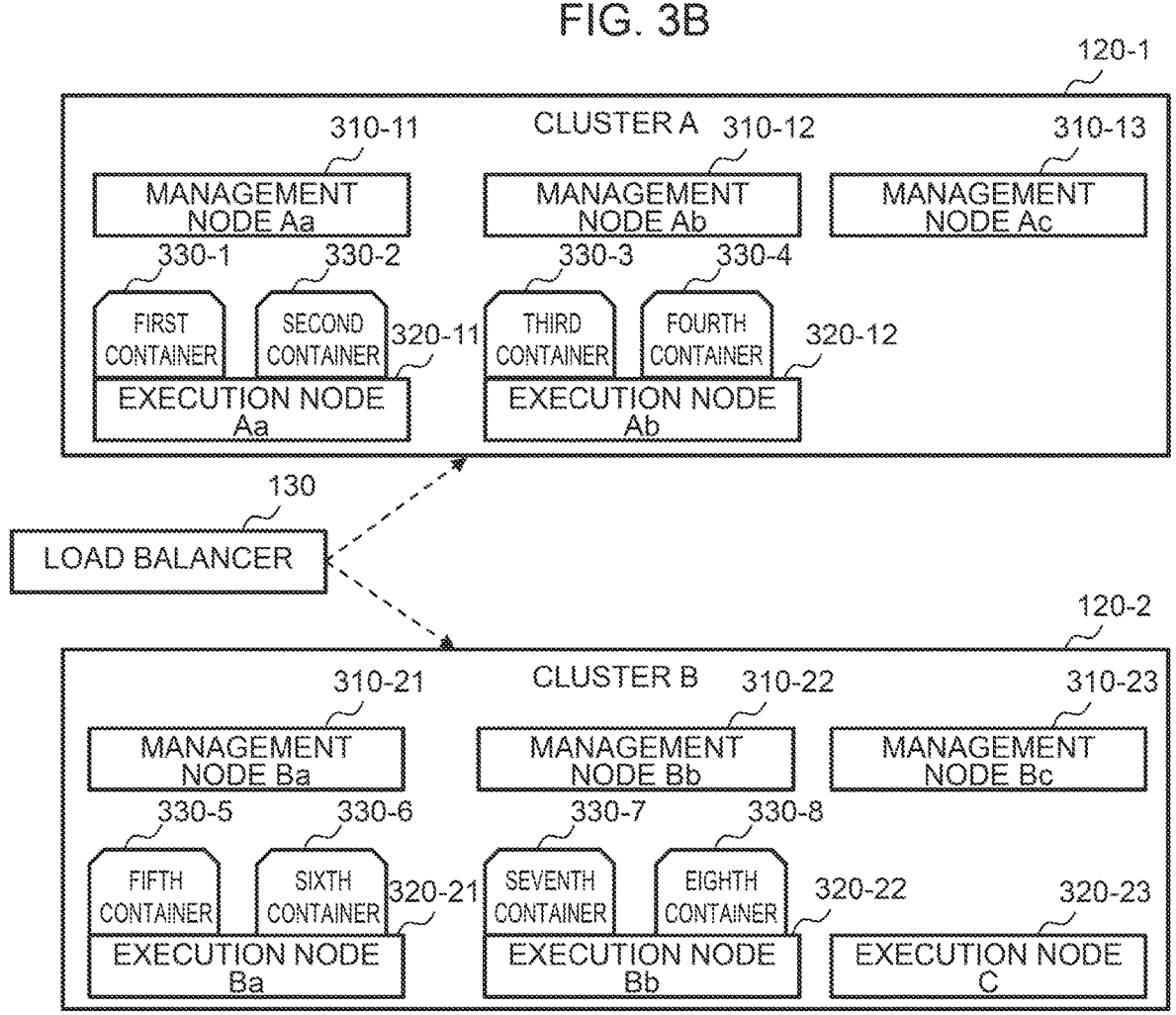
FIG. 3B is a diagram showing n example of the configuration of the cluster A and the cluster B according to the first embodiment.

FIG. 3B is a diagram showing an example of the configuration of the cluster A and the cluster B.

The cluster A and the cluster B are both currently used systems, and are operated by business communication being distributed by the load balancer 130. In this embodiment, the cluster A and the cluster B have the same configuration (node size, setting value and the like) as the cluster 120 excluding the point that an execution node 320-23 that is not provided with the container 330 (hereinafter referred to as the "execution node C") is included in the cluster B.

Here, on the assumption that each execution node 320 is being operated at a predetermined operating rate (for example, usage rate of a predetermined resource is roughly 50%) in the cluster A and the cluster B, if one cluster 120 is stopped in order to update that cluster 120, the execution node 320 of the other cluster 120 will assume the entire business processing, which in turn will deteriorate the response and affect the business operation.

With respect to this point, in the cluster management server 110, when updating one cluster 120, the management information of the one cluster 120 and the management information of the other cluster 120 are updated, and the execution node 320 of the one cluster 120 is transferred to the other cluster 120 and then operated. With the configuration described above, while the management of the execution node 320 is transferred from one management node 310 to the other management node 310, since the load of each execution node 320 is not changed, it is possible to avoid a situation where the response will deteriorate.

In the following explanation, a case where the one cluster 120 to be updated first is the cluster A and the other cluster is the cluster B is explained. Moreover, the management node 310 group consisting of a management node 310-11, a management node 310-12, and a management node 310-13 may be referred to as the "management node A", and the management node 310 group consisting of a management node 310-21, a management node 310-22, and a management node 310-23 may be referred to as the "management node B". Moreover, an execution node 320-11 and an execution node 320-12 may be referred to as the "execution node A", and an execution node 320-21 and an execution node 320-22 may be referred to as the "execution node B". Moreover, a first container 330-1, a second container 330-2, a third container 330-3, and a fourth container 330-4 may be referred to as the "container A".

FIG. 4 is a diagram showing an example (node cluster table 400) of the node cluster information 221.

The node cluster table 400 stores a record including values of a plurality of items indicating the node cluster information 221. More specifically, the node cluster table 400 stores a record in which information such as a node name 401, a classification 402, a management node group 403, an affiliated cluster 404, and an update status 405 are associated.

The node name 401 indicates a node name capable of identifying the node. The classification 402 indicates a classification of the node. The management node group 403 indicates the management node 310 group that is managing the node. The affiliated cluster 404 indicates the cluster 120 (affiliated cluster) with which the node is currently affiliated. The update status 405 indicates an update status of the node.

FIG. 5 is a diagram showing an example (execution node table 500) of the execution node information 222.

The execution node table 500 stores a record including values of a plurality of items indicating the execution node information 222. More specifically, the execution node table 500 stores a record in which information such as a container name 501, an original host 502, and a current host 503 are associated.

The container name 501 indicates a container name capable of identifying the container. The original host 502 indicates a node name capable of identifying the execution node 320 (original host) to which the container has been originally provided.

The current host 503 indicates a node name capable of identifying the execution node 320 (current host) to which the container is currently provided.

Figure 6:
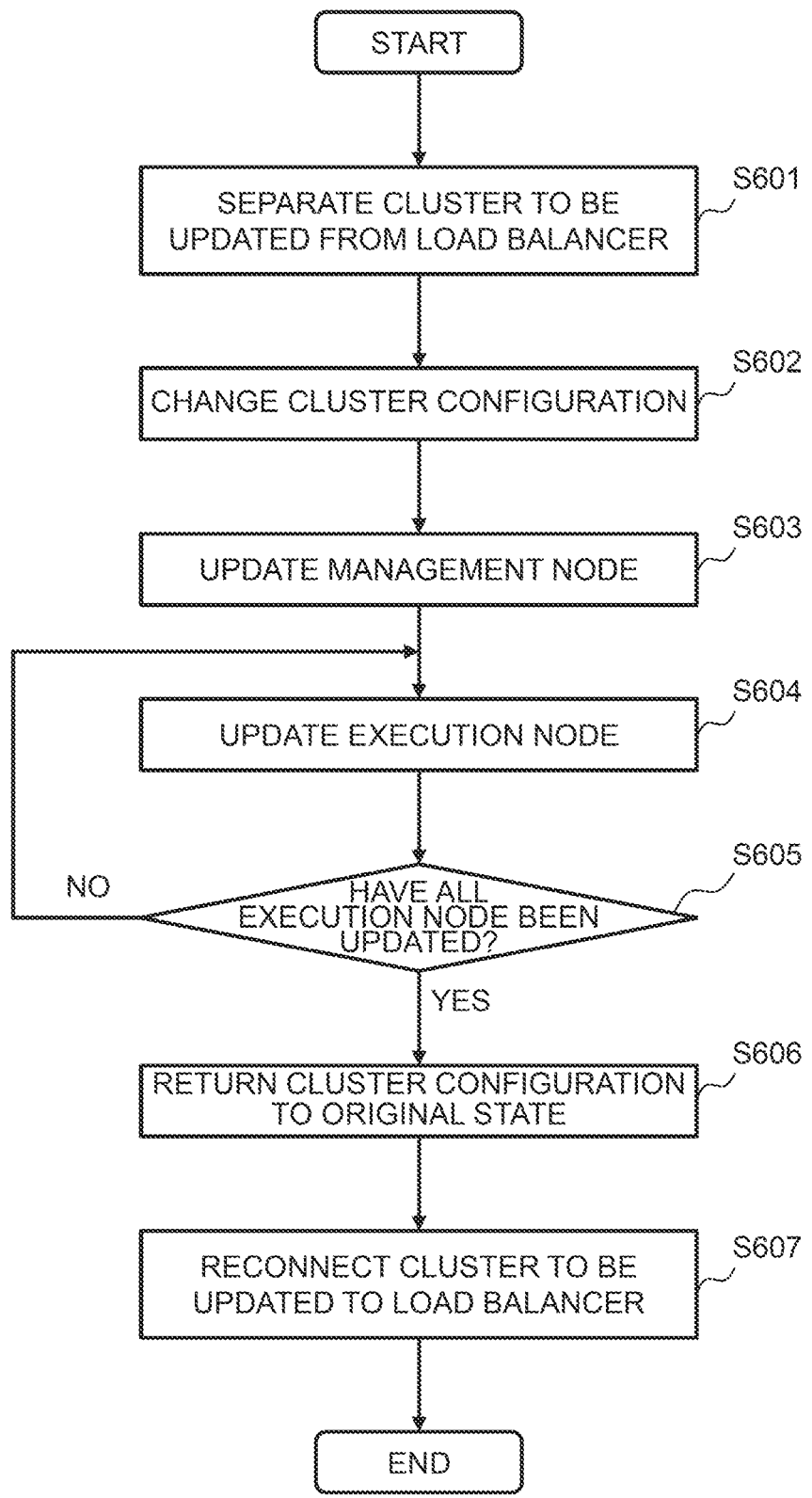
FIG. 6 is a diagram showing an example of the update processing according to the first embodiment.

FIG. 6 is a diagram showing an example of the processing (update processing) of the cluster management server 110 updating the cluster 120.

In step S601, the cluster management server 110 sends an instruction to the load balancer 130 to isolate the cluster 120 (for example, cluster A) to be updated.

In step S602, the cluster management server 110 changes the cluster configuration. For example, the cluster management server 110 sends an instruction to the management node A of the cluster A and the management node B of the cluster B to transfer the two execution nodes A included in the cluster A to the cluster B.

In step S603, the cluster management server 110 updates the management node 310. For example, the cluster management server 110 sends an instruction to the management node A to update the management node A of the cluster A.

In step S604, the cluster management server 110 updates the execution node 320. For example the cluster management server 110 sends an instruction to the management node A of the cluster A and the management node B of the cluster B to arbitrarily select one among the execution nodes A that have not been transferred to the cluster B and updated, transfer all containers A in the selected execution node A to the execution node C, transfer the execution node A to the cluster A and update the execution node A, return the updated execution node A to the cluster B, and return all containers A that were transferred to the execution node C.

In step S605, the cluster management server 110 determines whether all execution nodes 320 transferred in step S602 have been updated. For example, the cluster management server 110 proceeds to the processing of step S606 when it determines that all execution nodes A have been updated, and proceeds to the processing of step S604 when it determines that one of the execution nodes A has not been updates.

In step S666, the cluster management server 110 returns the cluster configuration to the original state. For example, the duster management server 110 sends an instruction to the management node A of the duster A and the management node B of the duster B to transfer the two execution nodes A, which were transferred to the duster B, to the cluster A.

In step S607, the cluster management server 110 sends an instruction to the load balancer 130 to reconnect the cluster 120 (for example, cluster A) to be updated.

Note that, while the explanation described above explained a case of updating the cluster A, the same basically applies to the cluster B, and the processing of step S601 to step S607 is also performed when updating the cluster B. Nevertheless, the difference is in that, when the management node B is updated in step S603, the execution node C is also updated, and the updated execution node C is transferred from the cluster B to the cluster A.

Figure 7:
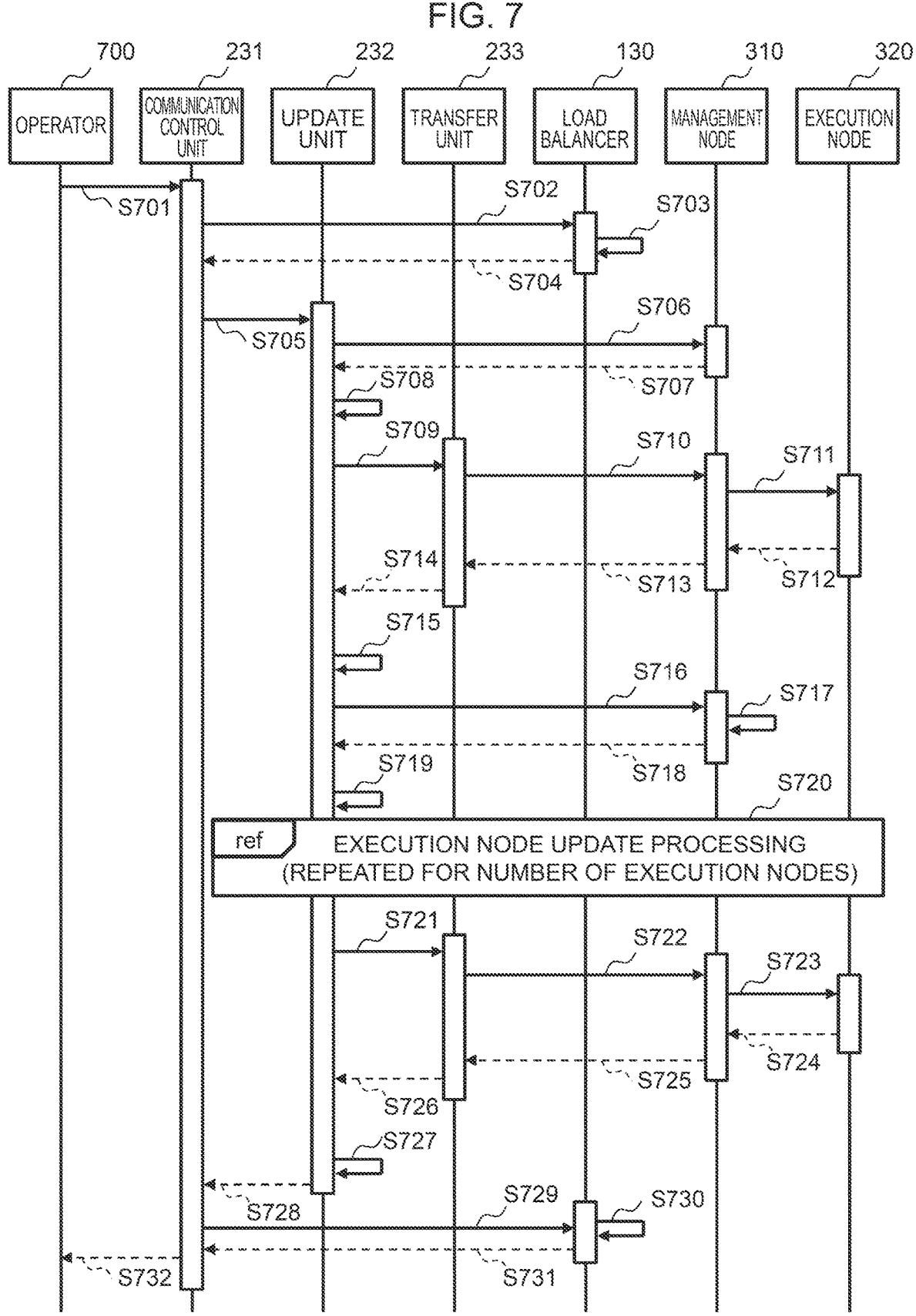
FIG. 7 is a diagram showing an example of the sequence according to the first embodiment.
Figure 8:
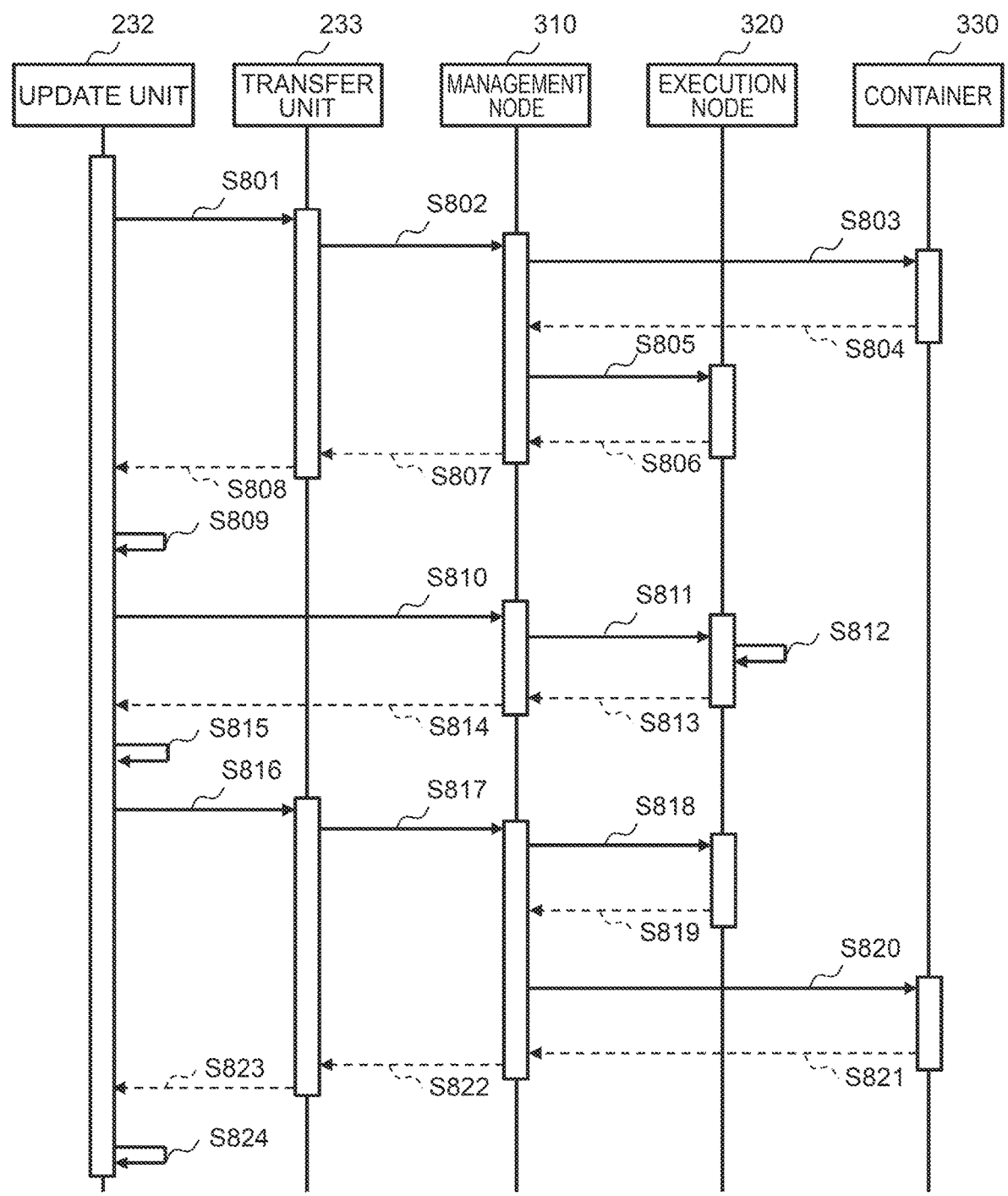
FIG. 8 is a diagram showing an example of the sequence according to the first embodiment.

FIG. 7 and FIG. 8 are diagrams showing an example of the series of processing (sequence) performed in the update processing.

In step S70 the operator 700 gives an operation star instruction via the input device 244.

In step S702, the communication control unit 231 instructs the load balancer 130 to isolate the cluster 120 based on the operation start instruction. In the following explanation, a case where the cluster 120 isolated in step S702 is the cluster A is explained.

In step S703, the load balancer 130 corrects the load balance destination. For example, the load balancer 130 updates the configuration information of the load balance 130 so as to block business communication to the cluster A.

In step S704, the load balancer 130 sends the processing result to the communication control unit 231.

Figure 9:
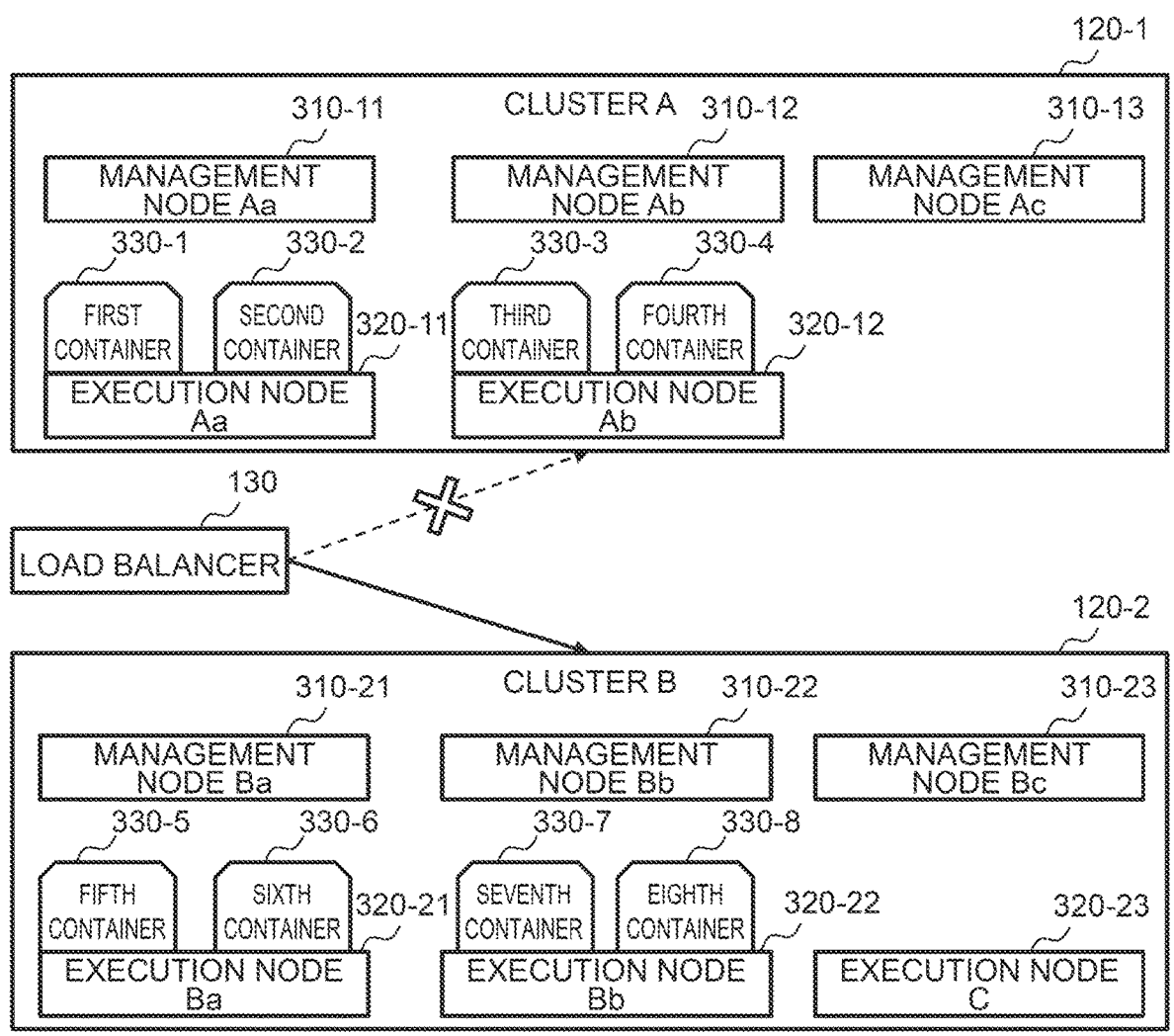
FIG. 9 is a diagram showing an example of the configuration of the clusters according to the first embodiment.
Figure 10:
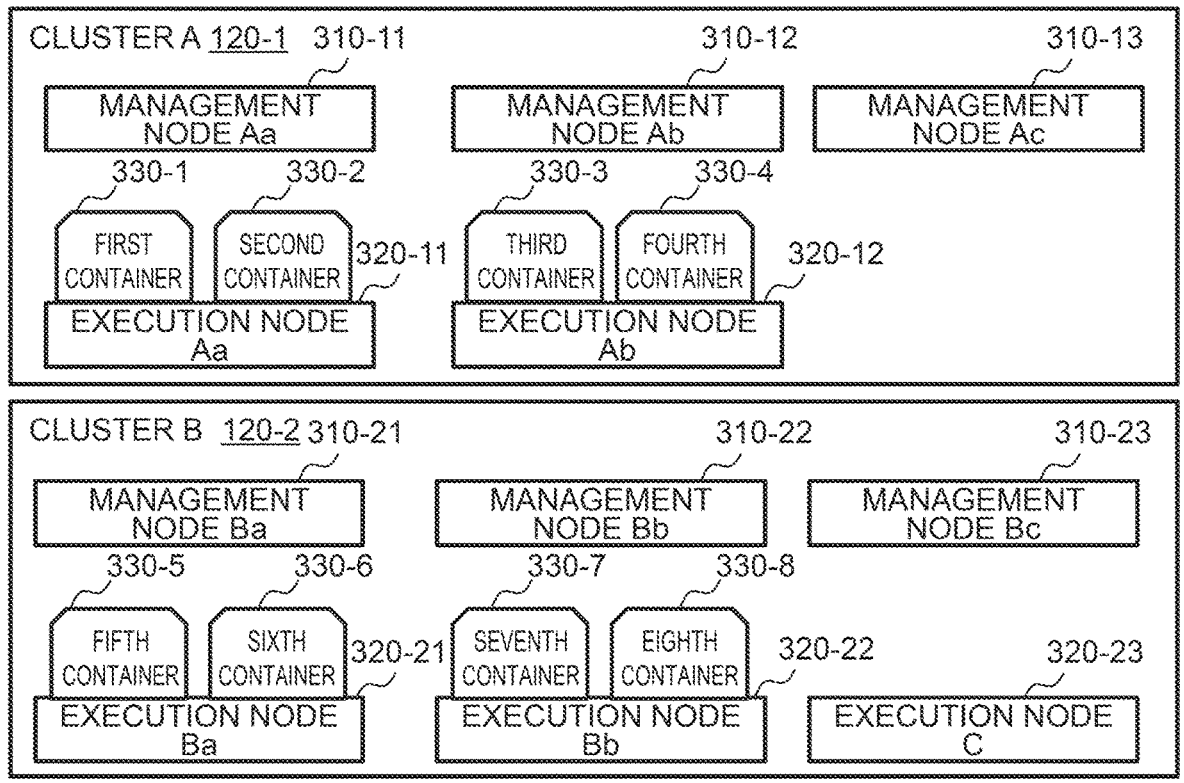
FIG. 10 is a diagram showing an example of the configuration of the clusters according to the first embodiment.

The configuration of the cluster 120 after the processing of step S704 has been performed is now explained with reference to FIG. 9 and FIG. 10. As shown in FIG. 9, in the update processing, the duster A to be updated is foremost isolated from the load balancer 130. Subsequently, as shown in FIG. 10, the initial status of the cluster 120 is a status in which the execution node A is included to be under management of the management node A in the cluster A, and the execution node B and the execution node C are included to be under management of the management node B in the cluster B.

In step S705, the communication control unit 231 sends an operation start instruction to the update unit 232.

In step S706, the update unit 232 requests the management node 310 of the cluster 120 to be updated to send the version information of that cluster 120. In this example, the update unit 232 requests the management node A to the send the version information of the cluster A.

In step S707, the management node 310 that received the request for sending the version information sends the version information to the update unit 232.

In step S708, the update unit 232 decides the details of the update processing (how to update the cluster 120). For example, when updating the version from "4.1" to "4.5", the update unit 232 decides whether to once apply "4.3" and thereafter apply "4.5".

In step S709, the update unit 232 instructs the transfer unit 233 to correct the cluster configuration of the cluster 120. For example, the update unit 232 instructs the transfer unit 233 to transfer all execution nodes A of the cluster A to the cluster B.

In step S710, the transfer unit 233 sends an instruction of transferring management of the execution node 320 of the cluster 120 to be updated (hereinafter referred to as the "target cluster") from the management node 310 of that cluster 120 to the management node 310 of another cluster 120 (hereinafter referred to as the "other cluster") to the management node 310 of the target cluster and the management node 310 of the other cluster. For example, the transfer unit 233 sends, to the management node A and the management node B, an instruction of correcting the management information so as to transfer management of all execution nodes Ain the cluster A fro the management node A to the management node B of the cluster B.

In step S711, the management node 310 that received the instruction corrects the management information, and sends a change instruction of changing the management node 310 to the execution node 320. For example, the management node A corrects the management information so as to remove all execution nodes A in the cluster A from being under its management, and the management node B corrects the management information so as to add all execution nodes A in the cluster A to be under its management.

In step S712, the execution node 320 that received the change instruction performs processing related to the change of the management node 310, and sends the processing result to the management node 310 that sent the change instruction. For example, each execution node A in the cluster A performs processing of settings to be under management of the management node B and communicating with the management node B, and sends the processing result to the management node B.

In step S713, the management node 310 that received the processing result sends the processing result to the transfer unit 233.

In step S714, the transfer unit 233 sends the received processing result to the update unit 232.

Un step S715, the update unit 232 updates the node cluster information 221. For example, the update unit 232 identifies, among the records of the node cluster table 400, a record in which the classification 402 is "execution node" and the management node group 403 is "management node A", and updates the value of the affiliated cluster 404 of the identified record from "cluster A" to "cluster B".

Figure 11:
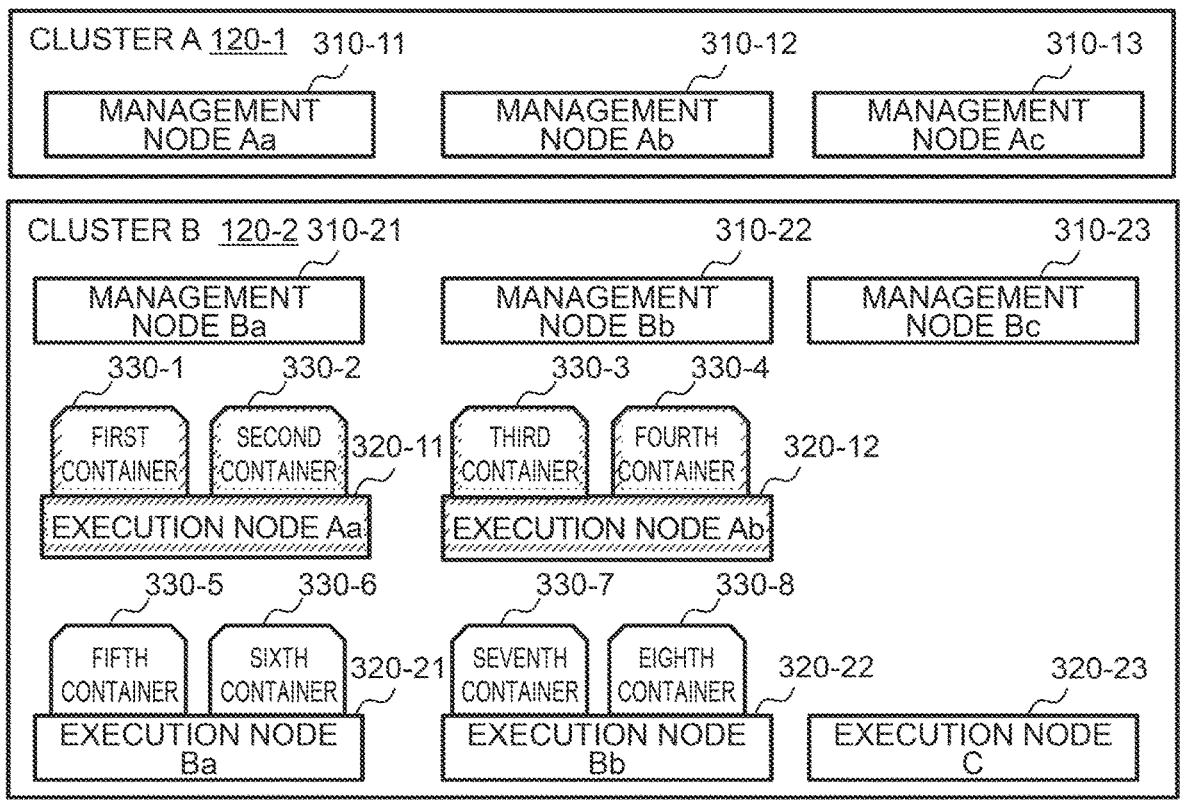
FIG. 11 is a diagram showing an example of the configuration of the clusters according to the first embodiment.

The configuration of the cluster 120 after the processing of step S715 has been performed is now explained with reference to FIG. 11. As shown in FIG. 11, the status of the cluster 120 becomes a status in which there is no execution node 320 under management of the management node A in the cluster A, and the execution node A, the execution node B, and the execution node C are included to be under management of the management node B in the cluster B. Consequently, the execution node A can, under management of the management, node B, execute the container A which runs a business application of performing business processing.

In step S716, the update unit 232 instructs the management node 310 to update the management node 310 to be updated.

In step S717, the management node 310 that received the instruction performs update processing. For example, the management node A acquires the update information of the management node A via the Internet according to the details decided in step S708, and applies the acquired update information.

In step S718, the management node 310 that performed the update processing sends the processing result to the update unit 232.

In step S719, when the update unit 232 receives the processing result, the update unit 232 updates the node cluster information 221. For example, the update unit 232 identifies, among the records of the node cluster table 400, a record in which the classification 402 is "management node" and the management node group 403 is "management node A", and updates the value of the update status 405 of the identified record from "Note updated" to "Updated".

Figure 12:
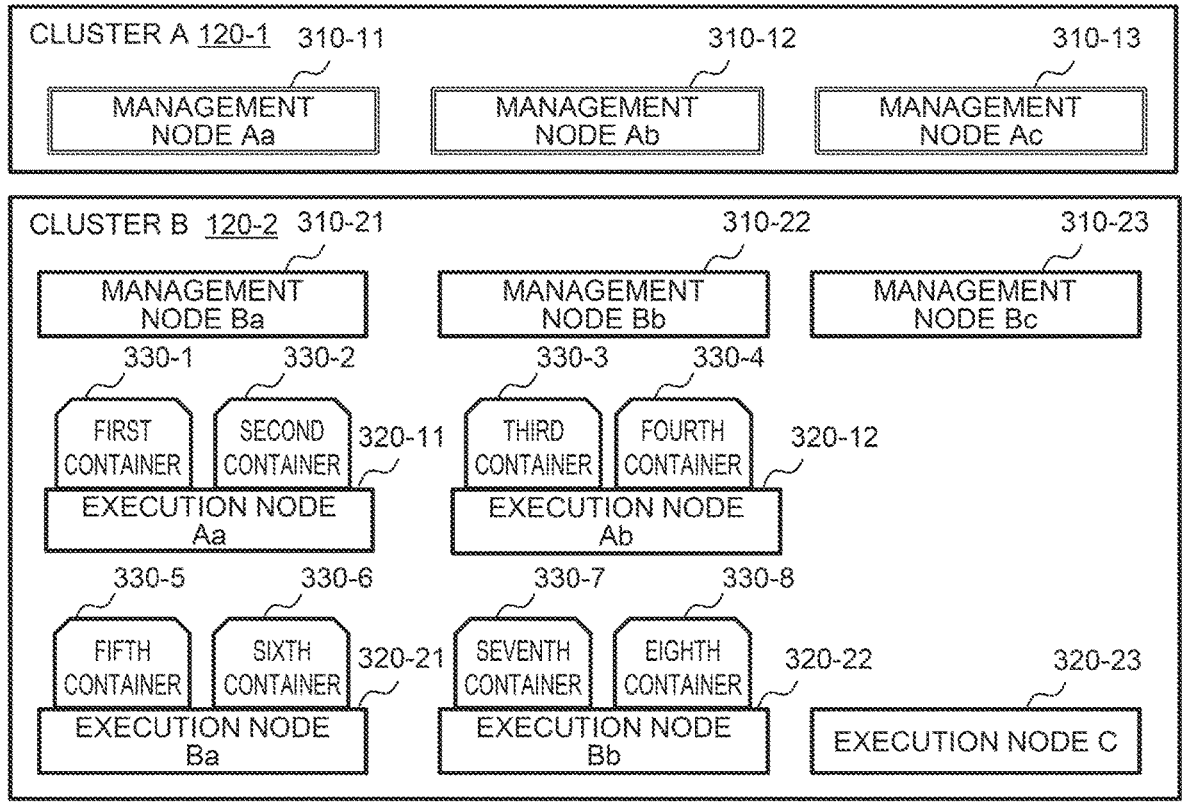
FIG. 12 is a diagram showing an example of the configuration of the clusters according to the first embodiment.

The configuration of the cluster 120 after the processing of step S719 has been performed is now explained with reference to FIG. 12. As shown in FIG. 12, the status of the cluster 120 becomes a status in which the management node A has been updated in the cluster A.

In step S720, the execution node update processing is repeated for the number of execution nodes 320. For example, since the execution node A consists of the execution node 320-11 and the execution node 320-12, the execution node update processing is performed twice.

FIG. 8 is a diagram showing an example of the series of processing (sequence) performed in the execution node update processing.

In step S801, the update unit 232 instructs the transfer unit 233 to transfer the execution node 320 to be updated (correct the duster configuration). For example, the update unit 232 sends to the transfer unit 233 an instruction of transferring management of an execution node A, which has not yet been updated, among the execution nodes A from the cluster B to the cluster A. In step S801, explained is a case where the execution node 320-11 has been selected as the execution node A that has not yet been updated.

In step S802, the transfer unit 233 instructs the transfer source management node 310 and the transfer destination management node 310 to transfer management of the execution node 320 to be updated from the management node 310 of the cluster 120 (transfer source) including that execution node 320 to the management node 310 of another cluster 120 (transfer destination). For example, the transfer unit 233 instructs the management node A and the management node B to correct the management information so that management of the execution node A is transferred from the management node B to the management node A.

In step S803, the transfer source management node 310 performs processing of transferring the container 330 in the execution node 320 to be updated to another execution node 320. For example, in order to transfer the container A in the execution node A to the execution node C, the management node B suspends the processing of the container A and completes the saving of the processing data, and thereafter stops the container A. Thereafter, the management node B adds a restriction to the operation definition information of the container A so that it runs only on the execution node C, and activates a similar container 330 in the execution node C by using the container image that has been shared among the respective nodes in advance.

In step S804, the transferred container 330 sends the processing result to the transfer source management node 310.

Figure 13:
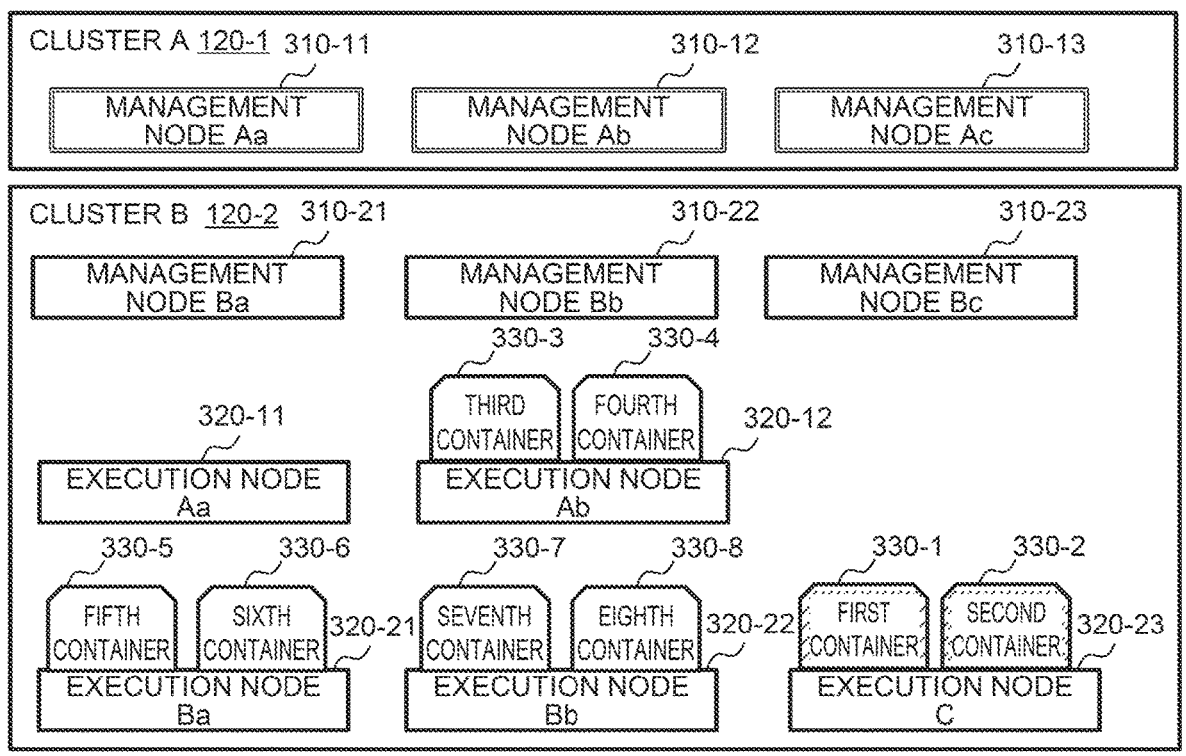
FIG. 13 is a diagram showing an example of the configuration of the clusters according to the first embodiment.

The configuration of the cluster 120 after the processing of step S804 has been performed is now explained with reference to FIG. 13. As shown in FIG. 13, the status of the cluster 120 becomes a status in which the execution node A, the execution node B, and the execution node C are included to be under management of the management node B in the cluster B, and the container A (first container 330-1 and second container 330-2) in the execution node A (execution node 320-11) is transferred to the execution node C (execution node 320-23) and executed. Consequently, the execution node C can execute the container A under management of the management node B.

In step S805, the transfer source management node 310 and the transfer destination management node 310 correct the management information, and send a change instruction of changing the management node 310 to the execution node 320 to be updated. For example, the management node B corrects the management information so as to remove the execution node A from being under its management, and the management node A corrects the management information so as to add the execution node A to be under its management.

In step S806, the execution node 320 that received the change instruction performs processing related to the change of the management node 310, and sends the processing result to the management node 310 that sent the change instruction.

In step S807, the management node 310 that received the processing result sends the processing result to the transfer unit 233.

In step S808 the transfer unit 233 sends the received processing result to the update unit 232.

In step S809, the update unit 232 updates the node cluster information 221 and the execution node information 222. For example, the update unit 232 identifies, among the records of the node cluster table 400, a record in which the node name 401 coincides with the node name of the execution node 320 to be updated, and updates the value of the affiliated cluster 404 of the identified record from "cluster B" to "cluster A". Moreover, for example, the update unit 232 identifies, among the records of the execution node table 500, a record in which the container name 501 coincides with the container name of the container A that was transferred to the execution node C in step S803, and updates the value of the current host 503 of the identified record to "execution node C".

Figure 14:
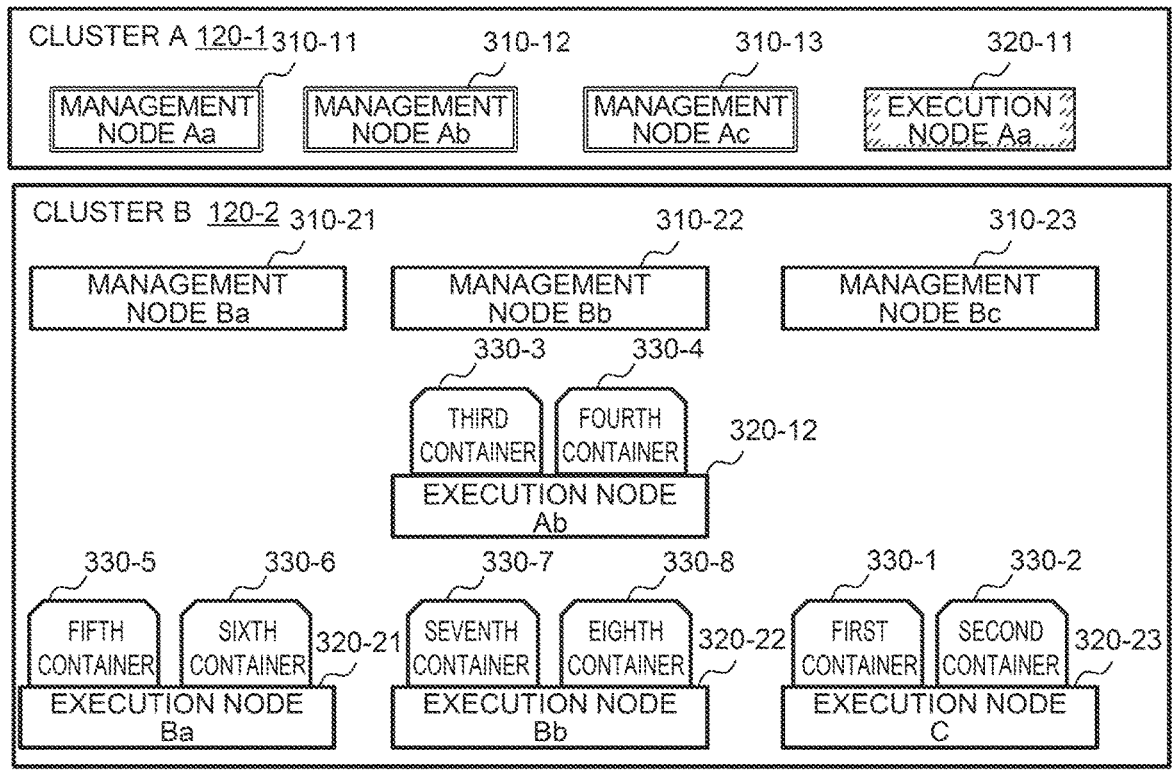
FIG. 14 is a diagram showing an example of the configuration of the clusters according to the first embodiment.

The configuration of the cluster 120 after the processing of step S809 has been performed is now explained with reference to FIG. 14. As shown in FIG. 14, the status of the cluster 120 becomes a status in which the execution node A (execution node 320-11), wherewith the container A (first container 330-1 and second container 330-2) has been transferred to the execution node C (execution node 320-23), is included to be under management of the management node A in the cluster A.

In step S810, the update unit 232 instructs the transfer destination management node 310 to update the execution node 320 to be updated.

In step S811, the transfer destination management node 310 instructs the execution node 320 to be updated to update that execution node 320.

In step S812, the execution node 320 that received the instruction performs update processing. For example, the execution node A acquires the update information of the execution node A via the internet according to the details decided in step S708, and applies the acquired update information.

In step S813, the execution node 320 that performed the update processing sends the processing result to the management node 310.

In step S814, the management node 310 that received the processing result sends the processing result to the update unit 232.

In step S815, when the update unit 232 receives the processing result, the update unit 232 updates the node cluster information 221. For example, the update unit 232 identifies, among the records of the node cluster table 400, a record in which the node name 401 coincides with the node name of the execution node 302 that was updated in step S812, and updates the value of the update status 405 of the identified record from "Not updated" to "Updated".

Figure 15:
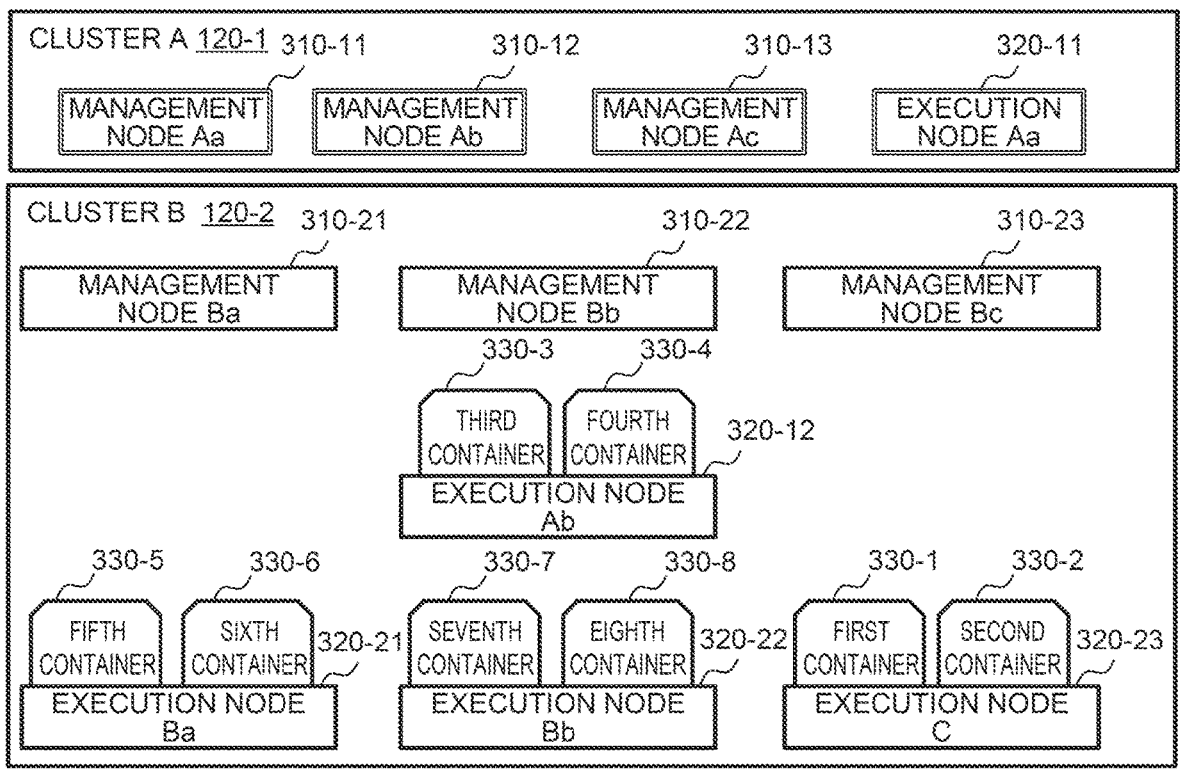
FIG. 15 is a diagram showing an example of the configuration of the dusters according to the first embodiment.

The configuration of the cluster 120 after the processing of step S815 has been performed is now explained with reference to FIG. 15. As shown in FIG. 15, the status of the duster 120 becomes a status in which the updated execution node A (execution node 320-11) is included to be under management of the updated management node A in the duster A.

In step S816, the update unit 232 instructs the transfer unit 233 to transfer the updated execution node 320 (correct the cluster configuration). For example, the update unit 232 sends an instruction to the transfer unit 233 for transferring management of the updated execution node A from the cluster A to the cluster B.

In step S817, the transfer unit 233 sends to the transfer source management node 310 and the transfer destination management node 310 an instruction of transferring management of the updated execution node 320 from the management node 310 of the transfer destination duster 120 to the management node 310 of the transfer source duster 120. For example, the transfer unit 233 instructs the management node A and the management node B to correct the management information so as to transfer management of the updated execution node A from the management node A to the management node B.

In step S818, the transfer source management node 310 and the transfer destination management node 310 correct the management information, and send a change instruction of changing the management node 310 to the updated execution node 320. For example, the management node A corrects the management information so as to remove the updated execution node A from being under its management, and the management node B corrects the management information so as to add the updated execution node A to be under its management.

In step S819, the execution node 320 that received the change instruction performs processing related to the change of the management node 310, and sends the processing result to the management node 310 that sent the change instruction.

Figure 16:
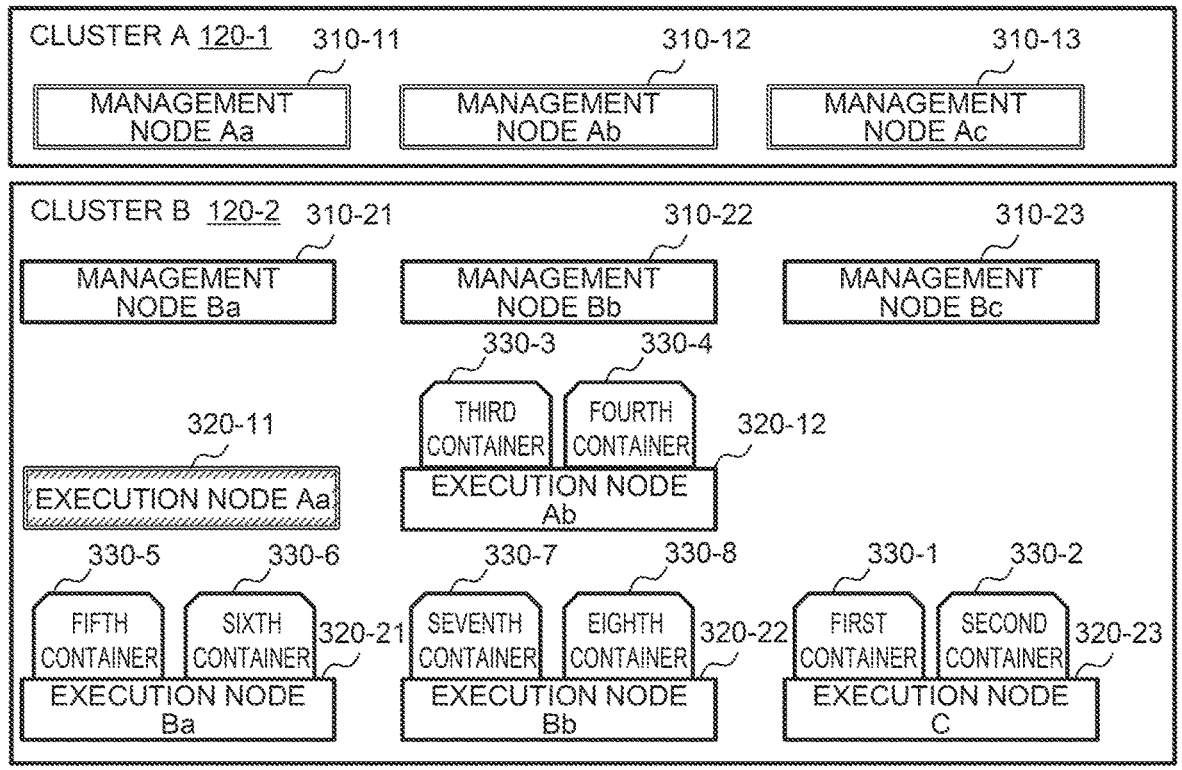
FIG. 16 is a diagram showing an example f the configuration of the clusters according to the first embodiment.

The configuration of the cluster 120 after the processing of step S819 has been performed is now explained with reference to FIG. 16. As shown in FIG. 16, the status of the cluster 120 becomes a status in which there is no execution node 320 under management of the updated management node A in the cluster A, and the updated execution node A (execution node 320-11), the non-updated execution node A (execution node 320-12), the execution node B, and the execution node C are included to be under management of the management node B in the cluster B.

In step S820, the transfer source management node 310 performs processing of transferring the container 330 that was originally provided to the updated execution node 320 from the execution node 320 to which that container 330 is currently being provided. For example, the management node B transfers the container A provided in the execution node C to the execution node A.

In step S821, the transferred container 330 sends the processing result to the transfer source management node 310.

In step S822, the management node 310 that received the processing result sends the processing result to the transfer unit 233.

In step S823, the transfer unit 233 sends the received processing result the update unit 232.

In step S824, the update unit 232 updates the node cluster information 221 and the execution node information 222. For example, the update unit 232 identifies, among the records of the node cluster table 400, a record in which the node name 401 coincides with the node name of the execution node 320 updated in step S812, and updates the value of the affiliated cluster 404 of the identified record from "cluster A" to "cluster B". Moreover, for example, the update unit 232 identifies, among the records of the execution node table 500, a record in which the container name 501 coincides with the container name of the container A that was transferred to the execution node A in step S820, and updates the value of the current host 503 of the identified record to "execution node A".

Figure 17:
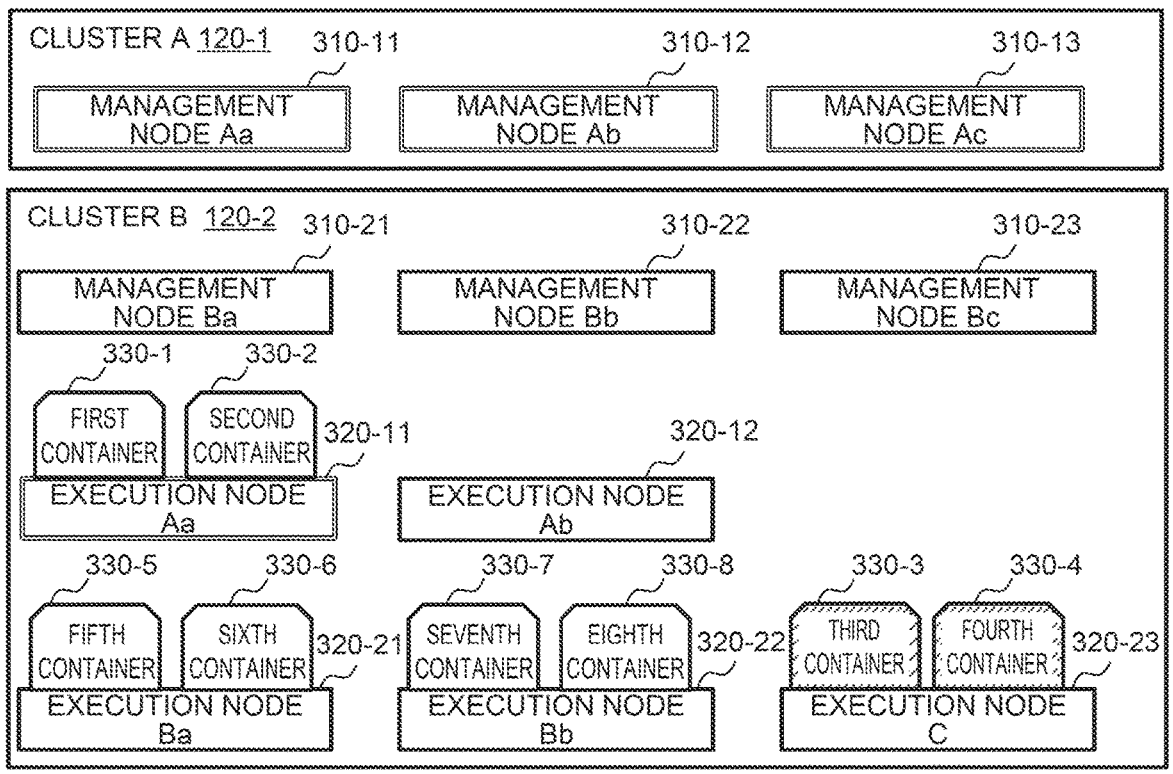
FIG. 17 is a diagram showing an example of the configuration of the clusters according to the first embodiment.
Figure 18:
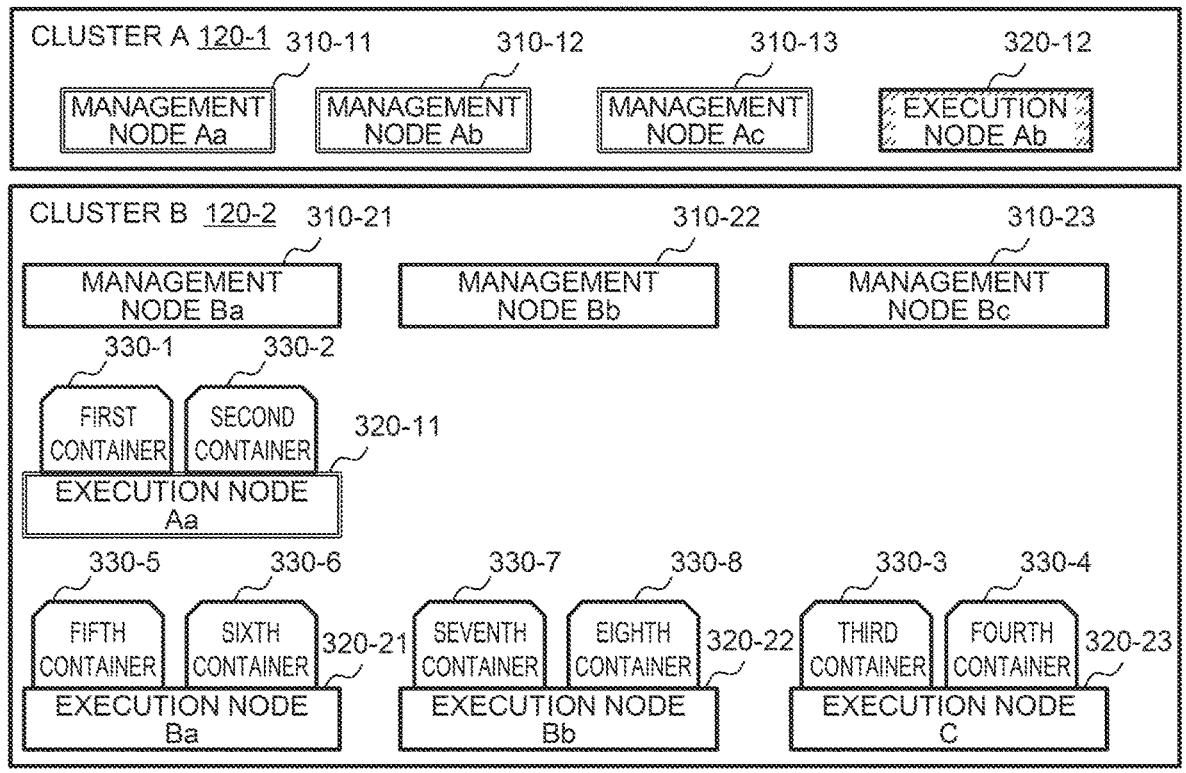
FIG. 18 is a diagram showing an example of the configuration of the dusters according to the first embodiment.
Figure 19:
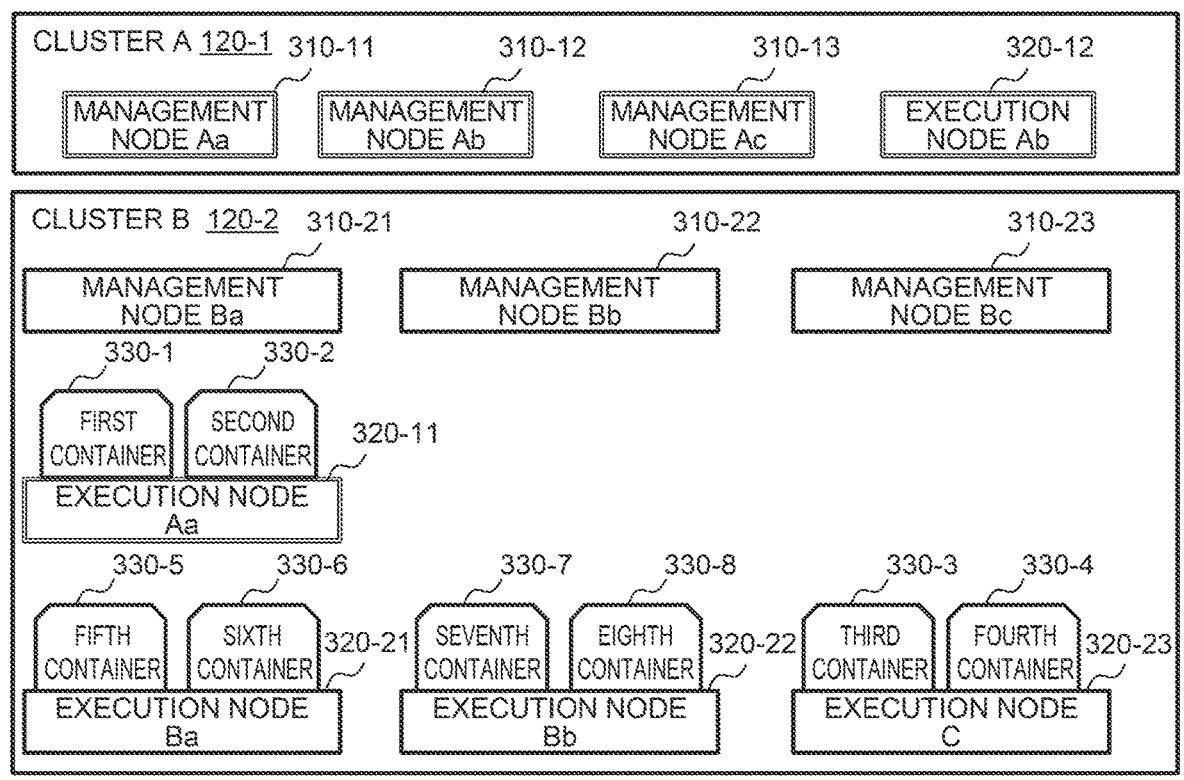
FIG. 19 is a diagram showing an example of the configuration of the clusters according to the first embodiment.
Figure 20:
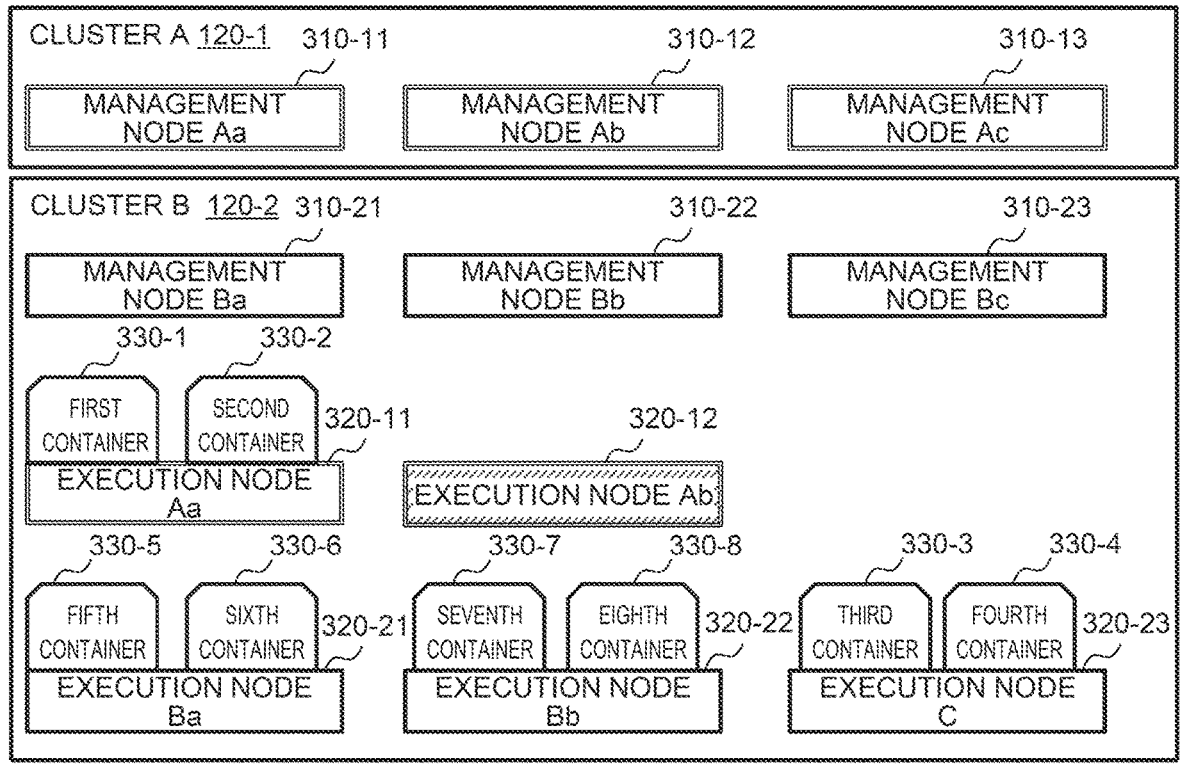
FIG. 20 is a diagram showing an example of the configuration of the clusters according to the first embodiment.
Figure 21:
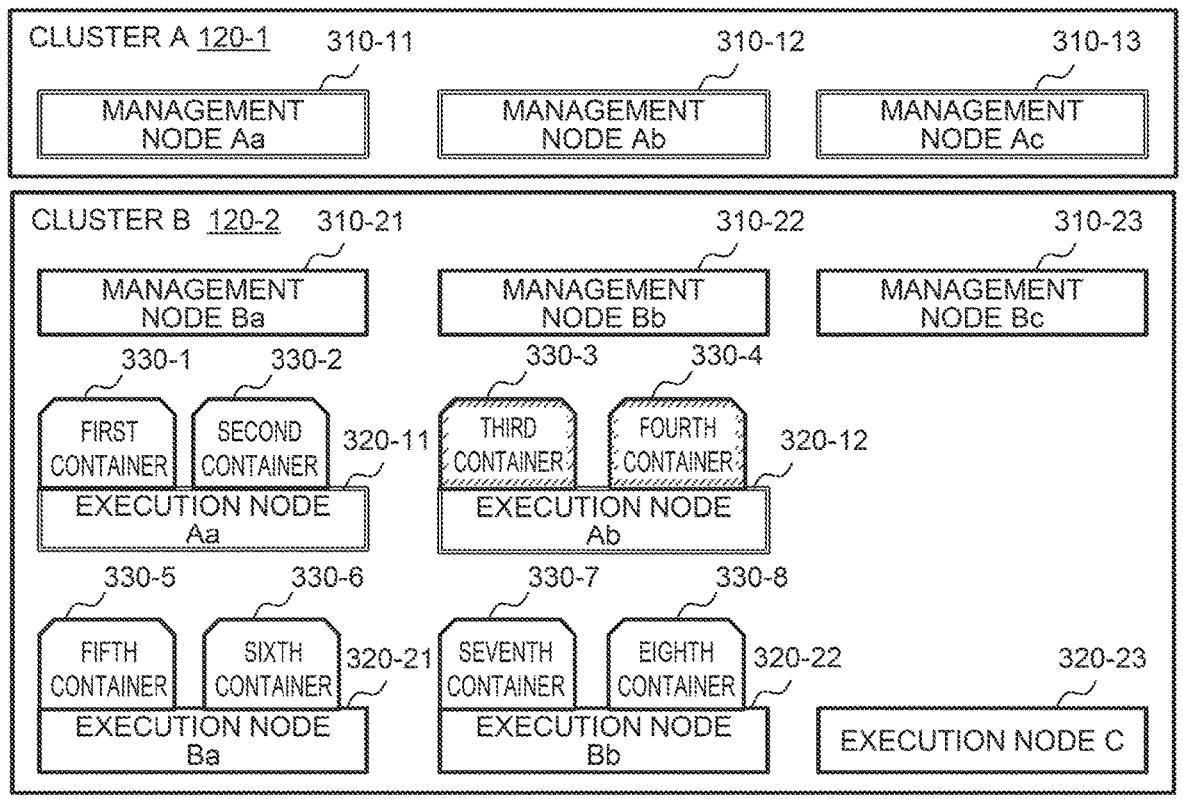
FIG. 21 is a diagram showing an example of the configuration of the dusters according to the first embodiment.

Note that the execution node update processing is repeated until all execution nodes 320 are updated. In this example, the execution node 320-12 is updated subsequent to the execution node 320-11. In the foregoing case, after the processing of step S804 is performed, the configuration of the duster 120 becomes the state shown in FIG. 17. Moreover, after the processing of step S809 is performed, the configuration of the duster 120 becomes the state shown in FIG. 18. Moreover, after the processing of step S815 is performed, the configuration of the duster 120 becomes the state shown in FIG. 19. Moreover, after the processing of step S819 is performed, the configuration of the duster 120 becomes the state shown in FIG. 20. Moreover, after the processing of step S824 is performed, the configuration of the cluster 120 becomes the state shown in FIG. 21.

In step S721, the update unit 232 instructs the transfer unit 233 to transfer all updated execution nodes 320 (correct the cluster configuration). For example, the update unit 232 sends to the transfer unit 233 an instruction of transferring management of all updated execution nodes A from the cluster B to the cluster A.

In step S722, the transfer unit 233 sends to the management node 310 of the target cluster and the management node 310 of the other cluster an instruction of transferring management of all updated execution nodes 320 from the management node 310 of the target duster to the management node 310 of the other duster. For example, the transfer unit 233 sends to the management node A and the management node B an instruction of correcting the management information so as to transfer management of all updated execution nodes A from the management node B to the management node A.

In step S723, the management node 310 of the target cluster and the management node 310 of the other cluster correct the management information, and send a change instruction of changing the management node 310 to all updated execution nodes 320. For example, the management node B corrects the management information so as to remove all updated execution nodes A from being under its control, and the management node A corrects the management information so as to add all updated execution nodes A to be under its control.

In step S724, the execution node 320 that received the change instruction performs processing related to the change of the management node 310, and sends the processing result to the management node 310 that sent the change instruction.

In step S725, the management node 310 that received the processing result sends the processing result to the transfer unit 233.

In step S726, the transfer unit 233 sends the received processing result to the update unit 232.

In step S727, the update unit 232 updates the node cluster information 221. For example, the update unit 232 identifies, among the records of the node cluster table 400, a record in which the classification 402 is "execution node" and the management node group 403 is "management node A", and updates the value of the affiliated cluster 404 of the identified record from "cluster B" to "cluster A".

Figure 22:
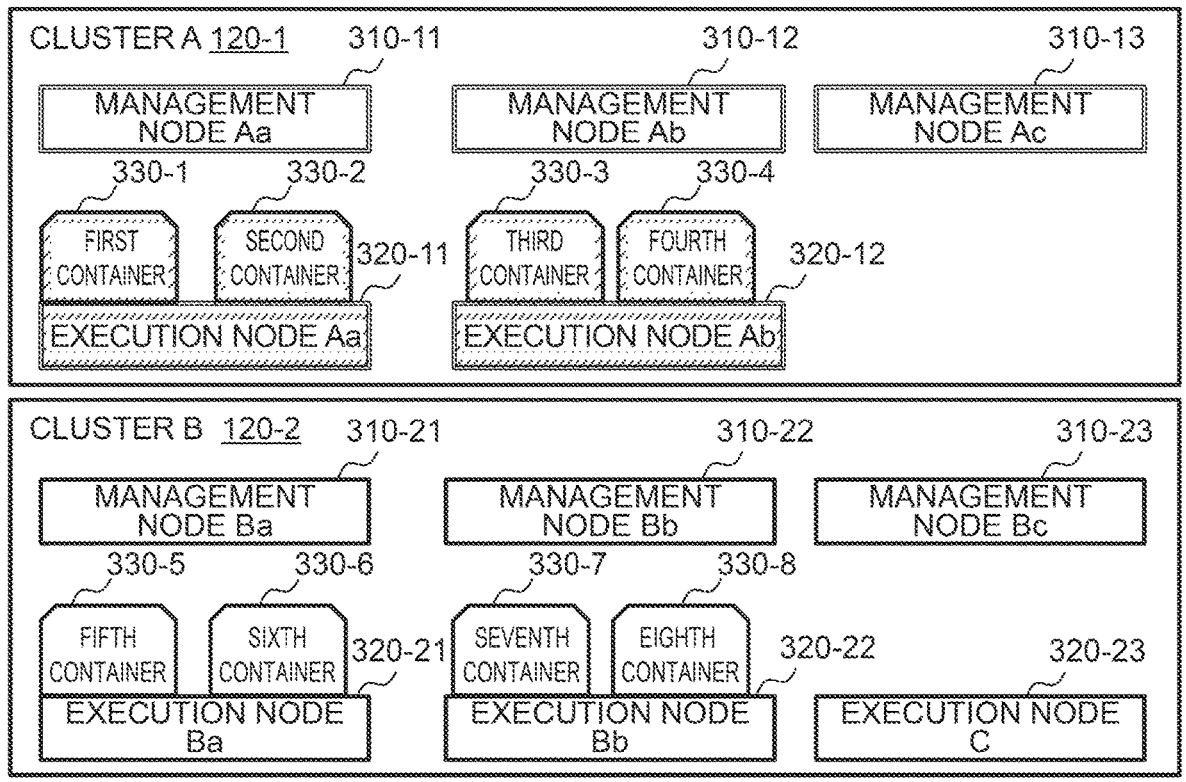
FIG. 22 is a diagram showing an example of the configuration of the clusters according to the first embodiment.

The configuration of the cluster 120 after the processing of step S727 is performed is now explained with reference to FIG. 22. As shown in FIG. 22, the status of the cluster 120 becomes a status in which the updated execution node A is included to be under management of the updated management node A in the cluster A, and the execution node B and the execution node C are included to be under management of the management node B in the cluster B.

Note that the processing of step S721 to step S727 may also be performed in the execution node update processing. In the foregoing case, the updated execution node 320 is returned to the target cluster each time the execution node 320 is updated.

In step S728, the update unit 232 sends the processing result to the communication control unit 231.

In step S729, the communication control unit 231 sends to the load balancer 130 a connection instruction of connecting the cluster 120 that was isolated in step S703.

In step S730, the load balancer 130 corrects the load balance destination. For example, the load balancer 130 updates the configuration information of the load balancer 130 so as to distribution business communication to the cluster A.

In step S731, the load balancer 130 sends the processing result to the communication control unit 231.

In step S732, the communication control unit 231 sends the processing result to the output device 245. The operator 700 assesses the processing result via the output device 245.

Moreover, in the business system 100, the other duster 120 (in this example, cluster B) may be subsequently updated in a similar manner automatically, or according to an operation from the operator 700.

Figure 23:
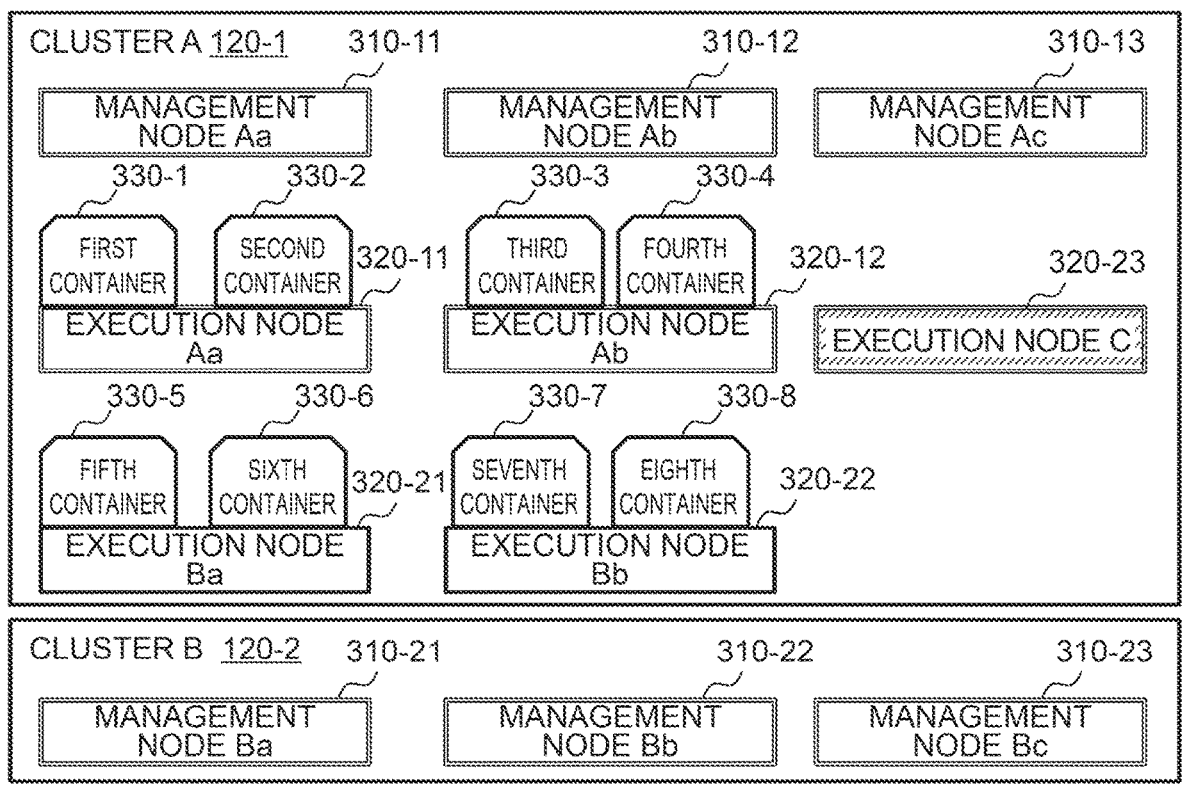
FIG. 23 is a diagram showing an example of the configuration of the clusters according to the first embodiment.

In the foregoing case, the execution node C is updated and then transferred to the duster A after the processing of step S719 is performed. The configuration of the cluster 120 at such point in time is now explained with reference to FIG. 23. As shown in FIG. 23, the status of the cluster 120 becomes a status in which the updated execution node A, the non-updated execution node B, and the updated execution node C are included to be under management of the updated management node A in the duster A, and there is no execution node 320 under management of the updated management node B in the cluster B.

Note that the timing of updating the execution node C is not limited to the timing described above. For example, the execution node C may also be transferred to the duster A before being updated, and may be transferred to the cluster B and updated after the processing of step S720 is performed.

According to this embodiment, it is possible to reduce influence on business operations resulting from the update of the cluster.

(II) Supplementary Notes

The embodiments described above include, for example, the following subject matter.

While the foregoing embodiment explained a case of applying the present invention to an update device, the present invention is not limited thereto, and may also be broadly applied to various other types of systems, devices, methods, and programs.

Moreover, while the foregoing embodiment explained a case where the duster 120 to be isolated in step S702 is the duster A, the present invention is not limited thereto. For example, the cluster 120 to be isolated in step S702 may also be the duster B. In the foregoing case, the execution node C is transferred from the cluster B to the cluster A.

Moreover, while the foregoing embodiment explained a case of transferring the container A of the execution node A to the execution node C, the present invention is not limited thereto. For example, the container A of the execution node A may also be transferred to the execution node B with plenty of resources. In the foregoing case, when there are a plurality of containers A, the containers A may be transferred by being distributed to a plurality of execution nodes B.

Moreover, while the foregoing embodiment explained a case of updating the execution nodes 320 one node at a time, the present invention is not limited thereto. For example, a plurality of execution nodes 320 may also be updated collectively.

Moreover, while the foregoing embodiment explained a case of updating the execution node C in the cluster B, the present invention is not limited thereto. For example, the execution node C in the cluster A may also be updated. In the foregoing case, the execution node C may be provided in the cluster A, and not the cluster B, in the initial status.

Moreover, a part or all of the programs in the foregoing embodiment may be installed from a program source to a device such as a computer which realizes the update device. The program source may also be, for example, a program distribution server connected to a network or a computer-readable storage medium (for example, non-temporary storage medium). Moreover, in the foregoing explanation, two or more programs may be realized as one program, and one program may be realized as two or more programs.

Moreover, in the foregoing embodiments, the configuration of each table is merely an example, and one table may be divided into two or more tables or all or a part of two or more tables may be one table.

Moreover, in the foregoing embodiments, the output of information is not limited to a visual output on a display. The output of information may also be a sound output from a speaker, output to a file, printing on a paper medium or the like by a printing device, projecting on a screen or the like by a projector, or any other mode of output.

Moreover, in the foregoing explanation, information of programs, tables, files and the like which realize the respective functions may also be stored in a memory, a storage device such as a hard disk or an SSD (Solid State Drive), or a storage medium such as an IC card, an SD card, a DVD or the like.

The embodiments described above include, for example, the following characteristic configurations.

(1)

An update device (for example, update device, cluster management server 110) which updates a first cluster (for example, cluster A, first cluster 120-1) configured by including a first execution node (for example, execution node A, execution node 320-11, 320-12) capable of executing business processing distributed by a load balancer (for example, load balancer 130) and a first management node (for example, management node A, management node 310-11 to 310-13) that manages the first execution node, and a second cluster (for example, cluster B, second cluster 120-2) configured by including a second execution node (for example, execution node B, execution node 320-21 to 320-23) capable of executing business processing distributed by the load balancer and a second management node (for example, management node B, management node 310-21 to 310-23) that manages the second execution node, comprising: a communication control unit (for example, communication control unit 231, circuit) which instructs the load balancer to stop distribution to the first cluster; a transfer unit (for example, transfer unit 233, circuit) which instructs the first management node and the second management node to transfer the first execution node from being under management of the first management node to being under management of the second management node; and an update unit (for example, update unit 232) which instructs the first management node to update the first management node on grounds that the first execution node being under management of the first management node has been transferred to being under management of the second management node.

With the configuration described above, since the first execution node of the first cluster is transferred to be under management of the second management node, business processing based on the first execution node can be performed under management of the second management node. According to the foregoing configuration, for example, business processing based on the first execution node can be performed even when the first management node is being updated.

(2)

The first execution node is provided with a container (for example, container A, first container 330-1 to fourth container 330-4) which runs a business application of performing business processing distributed by the load balancer, the second management node transfers the container to the second execution node (for example, see FIG. 13), the transfer unit instructs the first management node and the second management node to transfer the first execution node, after the container has been transferred to the second execution node, from being under management of the second management node to being under management of the first management node on grounds that the first management node has been updated (for example, see FIG. 14), and the update unit instructs the first management node to update the first execution node on grounds that the first execution node has been transferred from being under management of the second management node to being under management of the first management node (for example, see FIG. 15).

The timing that the container is transferred to the second execution node may be the timing that the first management node was updated, the timing that the first management node is being updated, or the timing before the first management node is updated.

With the configuration described above the container provided to the first execution node to be executed is transferred to the second execution node under management of the second management node, and business processing by the container can be performed in the second execution node. According to the foregoing configuration, for example, the operator can conduct business using the container even when the first execution node is being updated.

(3)

The transfer unit instructs the first management node and the second management node to transfer the first execution node from being under management of the first management node to being under management of the second management node on grounds that the first execution node has been updated (for example, see FIG. 15), the second management node transfers the container to the first execution node on grounds that the first execution node has been transferred to be under management of the second management node, and the transfer unit instructs the first management node and the second management node to transfer the first execution node and the second execution node from being under management of the second management node to being under management of the first management node on grounds that the first execution node has been transferred to the container (for example, see FIG. 23).

With the configuration described above, since the management of the second execution node is transferred from the second management node to the first first management node, for example, the second cluster can be updated in the same manner as the first cluster.

(4)

The second execution node includes a specified execution node (for example, execution node 320-21, 320-22) that is provided with a container which runs a business application of performing business processing distributed by the load balancer, and a predetermined execution node (for example, execution node C, execution node 320-23) that is not provided with a container which runs a business application of performing business processing distributed by the load balancer, and the transfer unit transfers the container to the predetermined execution node among the second execution nodes (for example, see FIG. 13).

With the configuration described above, since the container of the first execution node to be updated is transferred to the predetermined execution node, for example, the container can be operated without affecting the specified execution node that is performing business processing in the second cluster.

(5)

The transfer unit instructs the first management node and the second management node to transfer the first execution node from being under management of the first management node to being under management of the second management node on grounds that the first execution node has been updated (for example, see FIG. 16), the second management node transfers the container to the first execution node on grounds that the first execution node has been transferred to being under management of the second management node, and the transfer unit instructs the first management node and the second management node to transfer the first execution node and the specified execution node and the predetermined execution node from being under management of the second management node to being under management of the first management node on grounds that the first execution node has been transferred to the container (for example, see FIG. 23).

With the configuration described above, the predetermined execution node is transferred to the first cluster after the predetermined execution node is updated. According to the foregoing configuration, for example, by transferring the container of the specified execution node, which was transferred to the first cluster, to the predetermined execution node, the container can be operated without affecting the first execution node that is performing business processing in the first cluster.

Note that the update unit may also instruct the second management node to execute the update of the second management node and the update of the predetermined execution node on grounds that the first execution node and the specified execution node have been transfer from being under management of the second management node to being under management of the first management node, and the transfer unit may instruct the first management node and the second management node to transfer the predetermined execution node from being under management of the second management node to being under management of the first management node on grounds that the predetermined execution node has been updated.

According to the foregoing configuration, predetermined execution nodes can be updated efficiently.

Moreover, the foregoing configurations may be suitably changed, rearranged, combined or omitted to the extent that such change, rearrangement, combination or omission does not exceed the subject matter of the present invention.

Items included in, a list according to a format of "at least one among A, B, and C" should be understood to mean (A), (B), (C), (A and B), (A and C), (B and C) or (A, B, and C). Similarly, items included in a list according to a format of "at least one among A, B, or C" should be understood to mean (A), (B), (C), (A and B), (A and C), (B and C) or (A, B, and C).

REFERENCE SIGNS LIST 110 cluster management server (update device), 120 . . . cluster, 130 . . . load balancer.

The invention claimed is:

1. A processor functioning as an update device which updates a first cluster configured by including a first execution node capable of executing business processing distributed by a load balancer and a first management node that manages the first execution node, and a second cluster configured by including a second execution node capable of executing business processing distributed by the load balancer and a second management node that manages the second execution node, the update device comprising:
a communication control unit which instructs the load balancer to stop distribution to the first cluster;
a transfer unit which instructs the first management node and the second management node to transfer the first execution node from being under management of the first management node to being under management of the second management node; and
an update unit which instructs the first management node to update the first management node on grounds that the first execution node being under management of the first management node has been transferred to being under management of the second management node,
a node cluster table that stores records of names for nodes, classification of the nodes, management node groups that manage the nodes, affiliated clusters that indicate clusters with which the nodes are affiliated, and update status of the nodes, and
wherein the update unit identifies, among the records of the node cluster table, a record in which a node name of the node names coincides with a node name of an execution node to be updated, and updates a value of an affiliated cluster of the affiliated clusters of the identified record from the second cluster to the first cluster.

2. The update device according to claim 1, wherein:
the first execution node is provided with a container which runs a business application of performing business processing distributed by the load balancer;
the second management node transfers the container to the second execution node;
the transfer unit instructs the first management node and the second management node to transfer the first execution node, after the container has been transferred to the second execution node, from being under management of the second management node to being under management of the first management node on grounds that the first management node has been updated; and
the update unit instructs the first management node to update the first execution node on grounds that the first execution node has been transferred from being under management of the second management node to being under management of the first management node.

3. The update device according to claim 2, wherein:
the transfer unit instructs the first management node and the second management node to transfer the first execution node from being under management of the first management node to being under management of the second management node on grounds that the first execution node has been updated;
the second management node transfers the container to the first execution node on grounds that the first execution node has been transferred to be under management of the second management node; and
the transfer unit instructs the first management node and the second management node to transfer the first execution node and the second execution node from being under management of the second management node to being under management of the first management node on grounds that the first execution node has been transferred to the container.

4. The update device according to claim 2, wherein:
the second execution node includes a specified execution node that is provided with a container which runs a business application of performing business processing distributed by the load balancer, and a predetermined execution node that is not provided with a container which runs a business application of performing business processing distributed by the load balancer; and the transfer unit transfers the container to the predetermined execution node among the second execution nodes.

5. The update device according to claim 4, wherein:
the transfer unit instructs the first management node and the second management node to transfer the first execution node from being under management of the first management node to being under management of the second management node on grounds that the first execution node has been updated;
the second management node transfers the container to the first execution node on grounds that the first execution node has been transferred to being under management of the second management node; and
the transfer unit instructs the first management node and the second management node to transfer the first execution node and the specified execution node and the predetermined execution node from being under management of the second management node to being under management of the first management node on grounds that the first execution node has been transferred to the container.

6. An update method which updates a first cluster configured by including a first execution node capable of executing business processing distributed by a load balancer and a first management node that manages the first execution node, and a second cluster configured by including a second execution node capable of executing business processing distributed by the load balancer and a second management node that manages the second execution node, the update method comprising:
a step of a communication control unit instructing the load balancer to stop distribution to the first cluster;
a step of a transfer unit instructing the first management node and the second management node to transfer the first execution node from being under management of the first management node to being under management of the second management node;
a step of an update unit instructing the first management node to update the first management node on grounds that the first execution node being under management of the first management node has been transferred to being under management of the second management node,
storing, in a node cluster table, records of names for nodes, classification of the nodes, management node groups that manage the nodes, affiliated clusters that indicate clusters with which the nodes are affiliated, and update status of the nodes,
identifying, among the records of the node cluster table, a record in which a node name of the node names coincides with a node name of an execution node to be updated; and
updating a value of an affiliated cluster of the affiliated clusters of the identified record from the second cluster to the first cluster.

7. A non-transitory computer-readable storage medium encoded with a computer program which updates a first cluster configured by including a first execution node capable of executing business processing distributed by a load balancer and a first management node that manages the first execution node, and a second cluster configured by including a second execution node capable of executing business processing distributed by the load balancer and a second management node that manages the second execution node, which causes a computer to function as:
a communication control unit which instructs the load balancer to stop distribution to the first cluster;
a transfer unit which instructs the first management node and the second management node to transfer the first execution node from being under management of the first management node to being under management of the second management node; and
an update unit which instructs the first management node to update the first management node on grounds that the first execution node being under management of the first management node has been transferred to being under management of the second management node,
wherein the computer:
stores, in a node cluster table, records of names for nodes, classification of the nodes, management node groups that manage the nodes, affiliated clusters that indicate clusters with which the nodes are affiliated, and update status of the nodes,
identify, among the records of the node cluster table, a record in which a node name of the node names coincides with a node name of an execution node to be updated; and
updates a value of an affiliated cluster of the affiliated clusters of the identified record from the second cluster to the first cluster.

* * * * *